US009624023B2

(12) United States Patent
Williams et al.

(10) Patent No.: US 9,624,023 B2
(45) Date of Patent: Apr. 18, 2017

(54) INTEGRATED MATERIAL TRANSFER AND DISPENSING SYSTEM

(71) Applicant: CH&I Technologies, Inc., Santa Paula, CA (US)

(72) Inventors: Eric A. Williams, Ojai, CA (US); Lawrence M. Levenstein, Los Angeles, CA (US); Robert D. Thibodeau, Oxnard, CA (US)

(73) Assignee: CH&I Technologies, Inc., Santa Paula, CA (US)

( * ) Notice: Subject to any disclaimer, the term of this patent is extended or adjusted under 35 U.S.C. 154(b) by 693 days.

(21) Appl. No.: 14/020,177

(22) Filed: Sep. 6, 2013

(65) Prior Publication Data

US 2014/0166693 A1 Jun. 19, 2014

Related U.S. Application Data

(63) Continuation of application No. 11/584,932, filed on Oct. 21, 2006, now Pat. No. 8,534,499.

(Continued)

(51) Int. Cl.
*B67D 7/60* (2010.01)
*G01F 11/00* (2006.01)

(Continued)

(52) U.S. Cl.
CPC ....... *B65D 83/0005* (2013.01); *B67D 7/0233* (2013.01); *B67D 2210/0006* (2013.01); *B67D 2210/0016* (2013.01)

(58) Field of Classification Search
CPC .... B65D 83/005; B65D 83/64; B67D 7/0233; B67D 2210/0006; B67D 2210/0016;

(Continued)

(56) References Cited

U.S. PATENT DOCUMENTS 195,126 A * 9/1877 Hersey .................. B65D 83/64 222/389
1,504,423 A * 8/1924 Boneberg .................. F16N 5/00 222/173

(Continued)

FOREIGN PATENT DOCUMENTS

EP 0812801 A1 12/1997
EP 0839758 A1 5/1998

(Continued)

OTHER PUBLICATIONS

European Examination Report dated Oct. 10, 2014.

(Continued)

*Primary Examiner* — J. Casimer Jacyna
*Assistant Examiner* — Benjamin R Shaw
(74) *Attorney, Agent, or Firm* — Fulwider Patton LLP

(57) ABSTRACT

An integrated material transfer and dispensing system for storing, transferring and dispensing materials, such as fluids and liquids, for example, liquid applied sound deadener (LASD). The system includes at least one vessel having a force transfer device. Each vessel may be removably enclosed in cabinet to form an automated station. Each vessel may be configured with a data logger, cleanout port, a sample valve at least one sight window and an access port for introducing a compound such as a biocide. Each vessel may be configured with instruments including sensors for measuring process variables, such as material volume, level, temperature, pressure and flow. The system may further include a metering device system and a robotic material dispenser system without a pump interface. The robotic system may further include a computer control system connected to flow and pressure sensors. The system may directly feed an applicator without an intervening pump.

10 Claims, 25 Drawing Sheets

Related U.S. Application Data

(60) Provisional application No. 60/729,321, filed on Oct. 21, 2005, provisional application No. 60/729,405, filed on Oct. 21, 2005, provisional application No. 60/757,360, filed on Jan. 9, 2006, provisional application No. 60/841,111, filed on Aug. 29, 2006.

(51) Int. Cl.
*B65D 83/00* (2006.01)
*B67D 7/02* (2010.01)

(58) Field of Classification Search
CPC ..... B67D 1/04; B05C 17/015; B05B 11/0048; B05B 9/0838; B05B 9/047
USPC ...................... 222/389, 373, 386, 388, 146.6
See application file for complete search history.

(56) References Cited

U.S. PATENT DOCUMENTS 1,836,937 A * 12/1931 Rabinowitsch ........ A21D 6/003 222/390
2,744,662 A * 5/1956 Fletcher .................. B05B 9/047 222/105
2,745,575 A 5/1956 Spencer
3,042,268 A 7/1962 Pyles
3,164,303 A 1/1965 Trautmann
3,194,434 A 7/1965 Evanson
3,253,592 A 5/1966 Von Pechman
3,312,083 A * 4/1967 Scoggins ............. B67D 1/0857 62/389
3,403,818 A * 10/1968 Enssle ....................... B05B 9/04 222/175
3,873,007 A 3/1975 Christine et al.
4,059,714 A 11/1977 Scholl et al.
4,298,575 A 11/1981 Berglund et al.
4,323,176 A 4/1982 Sartain
4,355,736 A 10/1982 Schumacker et al.
4,405,061 A * 9/1983 Bergandy .................. B65B 3/30 222/148
4,417,473 A 11/1983 Tward et al.
4,445,629 A 5/1984 Doerfler
4,498,318 A 2/1985 Mitter
4,526,295 A 7/1985 Morel et al.
4,545,504 A 10/1985 Fabel et al.
4,548,342 A 10/1985 Fisher
4,592,495 A * 6/1986 Toda ................... B05C 11/1042 222/146.5
4,666,066 A 5/1987 Boccagno et al.
4,667,850 A 5/1987 Scholl et al.
4,692,351 A 9/1987 Maeda et al.
4,771,920 A 9/1988 Boccagno et al.
4,783,366 A 11/1988 Shimogo et al.
4,854,485 A 8/1989 Collins et al.
4,883,200 A 11/1989 Miller et al.
4,893,262 A * 1/1990 Kalata .................... G01G 11/08 177/59
4,935,261 A 6/1990 Srivastava et al.
4,936,493 A 6/1990 Foster et al.
5,031,805 A 7/1991 Rohmann
5,315,787 A 5/1994 Schleicher
5,341,726 A 8/1994 Watson
5,360,146 A 11/1994 Ikushima et al.
5,373,221 A 12/1994 McGee et al.
5,385,275 A * 1/1995 Billet ....................... B67D 1/04 141/18
5,418,040 A 5/1995 Kaneko et al.
5,419,466 A 5/1995 Scheindel
5,435,468 A 7/1995 Clark
5,462,207 A * 10/1995 Daraktchiev ............ B01J 4/001 141/91
5,524,797 A 6/1996 Schultz
5,564,595 A 10/1996 Minissian
5,707,234 A 1/1998 Bender et al.
5,730,324 A 3/1998 Shannon et al.
5,799,972 A 9/1998 Handman et al.
5,806,716 A 9/1998 Vogt
5,833,119 A 11/1998 Kolacek et al.
5,893,490 A * 4/1999 Gnyp .................. B05B 13/0431 222/526
5,913,455 A 6/1999 La Duong et al.
6,253,799 B1 7/2001 Guzowski et al.
6,264,066 B1 7/2001 Vincent et al.
6,319,532 B1 11/2001 Pineault
6,325,244 B2 12/2001 Vincent et al.
6,364,218 B1 4/2002 Tudor et al.
6,378,740 B1 * 4/2002 Martin ..................... B67D 1/04 222/334
6,433,315 B2 8/2002 Reifenberger et al.
6,488,651 B1 12/2002 Morris et al.
6,490,922 B1 12/2002 Sprea et al.
6,526,339 B1 * 2/2003 Herzog ................. B61L 25/025 105/311.1
6,540,105 B2 4/2003 Dorman et al.
6,602,492 B2 8/2003 Iwasaki et al.
6,726,773 B1 4/2004 Yanagita et al.
6,814,310 B2 11/2004 Boger
6,834,689 B1 12/2004 Peters
6,840,404 B1 1/2005 Schultz
6,861,100 B1 3/2005 Schucker
6,901,971 B2 * 6/2005 Speasl ................... G03F 7/7075 141/1
6,916,025 B2 7/2005 Brisson
6,975,966 B2 12/2005 Scott et al.
7,311,224 B2 * 12/2007 Emmendoerfer ..... B08B 9/0325 137/240
2002/0117512 A1 8/2002 Earle
2002/0148858 A1 * 10/2002 Bertone .................. A47J 31/41 222/129.4
2003/0024955 A1 * 2/2003 Maguire ................... B01F 3/18 222/559
2003/0071082 A1 4/2003 Johnson et al.
2003/0080142 A1 * 5/2003 Meheen ............... B67D 1/1252 222/1
2004/0069813 A1 4/2004 Brisson
2005/0121462 A1 * 6/2005 Allen .................. A01M 7/0046 222/31
2005/0232072 A1 10/2005 Thibodeau et al.
2006/0175352 A1 * 8/2006 Emmendorfer ....... B08B 9/0325 222/148
2008/0280380 A1 * 11/2008 Dietz ...................... F17C 11/00 438/14

FOREIGN PATENT DOCUMENTS

FR 2701253 A1 8/1994
FR 2789059 A1 8/2000
WO 9205406 A1 4/1992
WO 2005097666 A1 10/2005

OTHER PUBLICATIONS

Bibliographic Data.
PCT International Search Report, PCT/US2005/011007, Jul. 27, 2005, pp. 1-4 and PCT Written Opinion, PCT/US2005/011007, Jul. 27, 2005, pp. 5-7.
PCT International Search Report, PCT/US2006/041193, Sep. 17, 2007.
PCT Written Opinion, PCT/US2006/041193, Sep. 17, 2007.

* cited by examiner

INTEGRATED MATERIAL TRANSFER AND DISPENSING SYSTEM

CROSS-REFERENCE TO RELATED APPLICATIONS

This application is a continuation application of U.S. application Ser. No. 11/584,932, filed Oct. 21, 2006, which claims the benefit of U.S. Provisional Patent Application Ser. No. 60/729,321, filed Oct. 21, 2005, U.S. Provisional Patent Application Ser. No. 60/729,405, filed Oct. 21, 2005, U.S. Provisional Patent Application Ser. No. 60/757,360, filed Jan. 9, 2006, and U.S. Provisional Patent Application Ser. No. 60/841,111, filed Aug. 29, 2006, the contents of which are each hereby incorporated herein by reference. The contents of U.S. Provisional Patent Application Ser. No. 60/558,691, filed Mar. 31, 2004; U.S. Pat. No. 7,997,445; and U.S. Pat. No. 5,435,468 are each hereby incorporated herein by reference.

BACKGROUND OF THE INVENTION

The present invention relates to the field of materials management, and more particularly to systems designed for containing, transferring, delivering and dispensing various materials, such as liquid applied sound deadener (LASD). The material management system of the invention is configured to deliver contamination free streams from a vessel that can be emptied and refilled repeatedly, with or without intervening cleaning of the vessel or its components.

Prior known material management systems have encountered difficulty transferring from a containment vessel certain thick, viscous fluids, liquids and other types of materials that may resist pumping and that can be damaging to pumping apparatus. As used herein, a fluid is a substance that is capable of flowing and that changes its shape at a steady rate when acted upon by a force tending to change its shape. Certain materials, while normally not considered to be fluids, also can be made to flow under certain conditions, for example, soft solids and semi-solids. Vast quantities of fluids are used in transportation, manufacturing, farming, mining, and industry. Thick fluids, viscous fluids, semi-solid fluids, visco-elastic products, pastes, gels and other fluid materials that are not easy to dispense from fluid sources (for example, pressure vessels, open containers, supply lines, etc.) comprise a sizable portion of the fluids utilized. These fluids include thick and/or viscous chemicals and other such materials, for example, lubricating greases, adhesives, sealants and mastics. The ability to transport these materials from one place to another, for example, from a container to a manufacturing or processing site, and in a manner that protects the quality of the material, is of vital importance.

Various components of fluid delivery systems are known, but are typically configured with heavy-duty pumps and are not integrated with a material delivery system having process controls and/or a computer interface capability. The contents of U.S. Pat. Nos. 4,783,366; 5,373,221; 5,418,040; 5,524,797; 6,253,799; 6,364,218; 6,540,105; 6,602,492; 6,726,773; 6,814,310; 6,840,404; and 6,861,100 are each hereby incorporated herein in their entirety by reference.

A refillable material transfer system may be configured to move highly viscous fluids from a vessel to a point of use. Such a material transfer system may be configured to dispense only the required amount of material without waste, which is especially important when chemicals are not easily handled and cannot be manually removed easily or safely from the vessel. Preferably, such a material transfer system would reduce or eliminate costs and expenses attendant to using drums, kegs and pails, as well as the waste of material associated with most existing systems. Because certain chemicals are sensitive to contamination of one form or another, such a material transfer system may be sealed, protect product quality, allow sampling without opening the container to contamination and permit proper attribution of product quality problems to either the supplier or the user. A refillable material transfer system mat further be configured to use low cost components and provide a non-mechanical (no moving parts), non-pulsating solution for dispensing and transferring thick fluids and other such materials.

There is a need for, and what was heretofore unavailable, an intelligent material transfer system having a plurality of sensors and transmitters associated with one or more material vessels. There is a need for such a refillable material transfer system that may be connected to a plurality of local control systems and integrated with a central computer control system that are enclosed within an environmentally controlled housing or cabinet. There is also a need for, and what was heretofore unavailable, an automated material transfer system configured to interface with a metering device system and/or a robotic material dispenser system. There is also a need for a an automated material transfer and dispensing system that interfaces with a material applicator and may include a pump. The refillable material transfer system may have a removable lid or be a closed system with access ports for observing and cleaning the vessel. The present invention satisfies these and other needs.

SUMMARY OF THE INVENTION

Briefly, and in general terms, the present invention is directed to a refillable material transfer system for dispensing various materials, including thick, viscous and other types of fluids that resist pumping and/or which might be damaging to pumping apparatus. The invention further provides a material management system adapted for delivery of contamination-free streams of fluid product, which can be emptied and refilled repeatedly without intervening cleaning of the apparatus. In another aspect, the invention further provides a material management system adapted to dispense thick, stiff, and/or viscous materials that resist flowing without the need for a separate pump or the need to couple a pump to a follower plate in the container. In a further aspect, the invention provides a material management system adapted to provide information to users as to how much fluid remains in the container. In yet another aspect, the invention provides a fluid management system adapted to deliver high fluid flow rates within a greater operational temperature range.

The present invention includes a refillable system for transferring material having a vessel configured with a first end having an inlet for a pressurized gas source, a second end having a manifold configured with a material inlet and a material exit, and a wall disposed between the first end and the second end so as to form a body of the vessel and to form an internal cavity within the vessel, the cavity having a transverse width. The system further includes a force transfer device disposed within the cavity of the vessel, wherein the force transfer device has a transverse width substantially less than the transverse width of the vessel. An annulus management device is removably attached to an outer perimeter of the force transfer device, and an entry port is configured on the body of the vessel for accessing the annulus management device.

The present invention is further directed to a system for monitoring the transfer of material, including a vessel and a force transfer device disposed within the vessel. The system may further include at least one instrument associated with the vessel, such as a volume sensor, a level sensor, a temperature sensor, a pressure sensor, a flow sensor, a GPS device, an RFID device, a weight cell and a timer. The system may include at least one communication device connected to at least one instrument, each communication device being hardwired or wireless. In addition, the system may be configured with a monitoring system connected to at least one communication device, the monitoring system including a processor, a data storage device, a display device and an operator input device. Further the system may include a central controller connected to at least one local controller, the central controller including a processor, a data storage device, a display device and an operator input device.

Other features and advantages of the invention will become apparent from the following detailed description, taken in conjunction with the accompanying drawings, which illustrate, by way of example, the features of the invention.

DETAILED DESCRIPTION OF THE INVENTION

Figure 1:
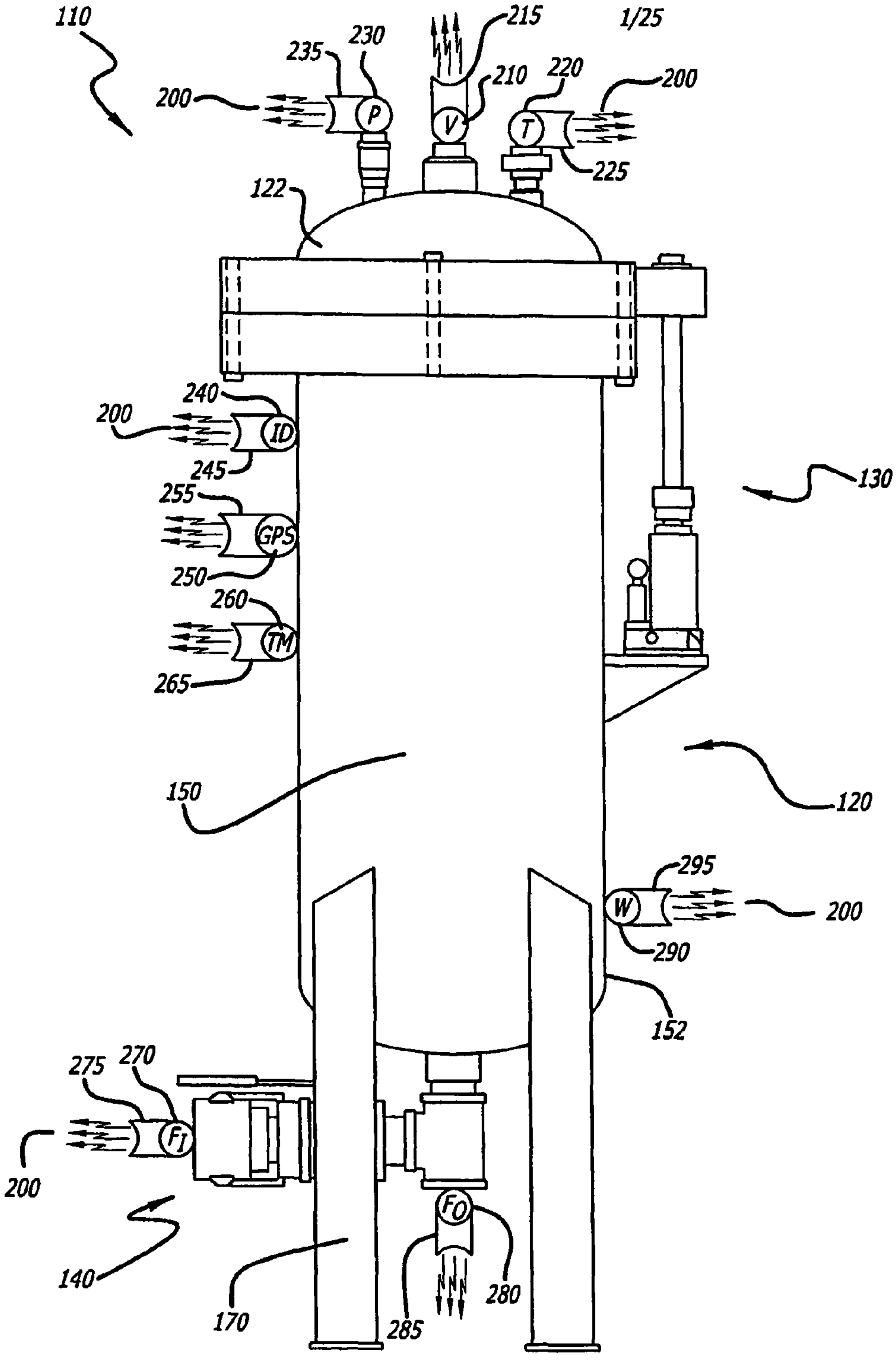
FIG. 1 is a side plan view of an intelligent material transfer subsystem of the present invention having a plurality of sensors and transmitters located on a material vessel.

As shown in the drawings for purposes of illustration, the present invention is directed to integrated material transfer and dispensing systems for dispensing various materials, including, but not limited to, oils, greases, mastics, sealants, elastomers and other types of fluids, such as liquid applied sound deadener (LASD). The system includes a material containment vessel with an upper region incorporating a motive force, and a bottom region with a material ingress and egress opening. A diconical or other shaped, level-instrumented force transfer device may be located in the material containment area. The present invention further includes incorporating a data acquisition system into known and yet to be developed refillable material transfer system technology.

Turning now to the drawings, in which like reference numerals represent like or corresponding aspects of the drawings, and with particular reference to FIG. 1, one embodiment of the intelligent automated material transfer system 110 of the present invention includes associating process instrumentation with a refillable material vessel 120 configured in a vertical format; however, horizontal and other configurations may be used. The material vessel includes a main body 150, a top 122, and one or more legs or extensions 170. The main body of the material vessel is configured in a cylindrical format having a lower portion 152 to be connected to the legs 170 and an upper portion to be connected to the top. So as to facilitate removal of the top 122 from the refillable vessel 120, a lifting mechanism 130 may be configured adjacent the main body 150 of the material vessel. The refillable material transfer system 110 may be further configured with a material inlet and outlet manifold 140 positioned below the main body 150 of the material vessel 120 and adjacent the bottom portion 152 of the vessel.

As shown in FIG. 1, the intelligent material transfer system 110 includes a plurality of sensors and transmitters located on the refillable material vessel 120. For example, on the top of the vessel 122, a volume sensor 210 and transmitter 215 are located between a temperature sensor 220 with transmitter 225 and a pressure sensor 230 with transmitter 235. As will be appreciated by those of ordinary skill in the art, many configurations of the sensors may be employed in such a transfer system. Likewise, the transmitters may include a wireless signal 200, hardwired signal or other connection to a remote receiver. Such transmissions may include radio frequency, microwave, infrared, coaxial, universal serial buss (USB) or other industry standards, such as, but not limited to, relay wiring, twisted pair, Bluetooth and Ethernet.

Various other sensors and transmitters may be included in the intelligent material transfer system 110, such as a flow inlet sensor 270 with transmitter 275 and flow outlet sensor 280 with transmitter 285 positioned in or about the fluid inlet outlet manifold 140 and vessel support device (legs or pedestals) 170. Similarly, the vessel 120 may be connected to a weight sensor 290 and transmitter 295, such as a load cell or similar device at or near the bottom 152 of the vessel. Further, identification devices 240 with transmitters 245, such as a radio frequency identification device (RFID), may be attached to or otherwise associated with the vessel. For purposes of locating such a material vessel, a global positioning system (GPS) device 250 and transmitter 255 may be associated with the automated material transfer system. Additionally, a mechanism for tracking the time that fluid has been retained in the vessel, such as a time sensor 260 with transmitter 265 may be configured with the system. Other timer related events, such as, but not limited to, depressurizing, start and end fill times may be monitored and/or tracked. Further, a sensor may be associated with the lifting mechanism 130 to indicate when the lid has been lifted or removed from the main body of the vessel. Such sensors may be passive or include the ability for intelligence, including operator input, local display and other functions. Alternatively, the sensors may be very simple devices, such as color dots, irreversible moisture indicators, conductivity sensors, pH sensors and the like. Other instrumentation may include devices for measurement and/or monitoring of gas properties and/or material properties.

Figure 2:
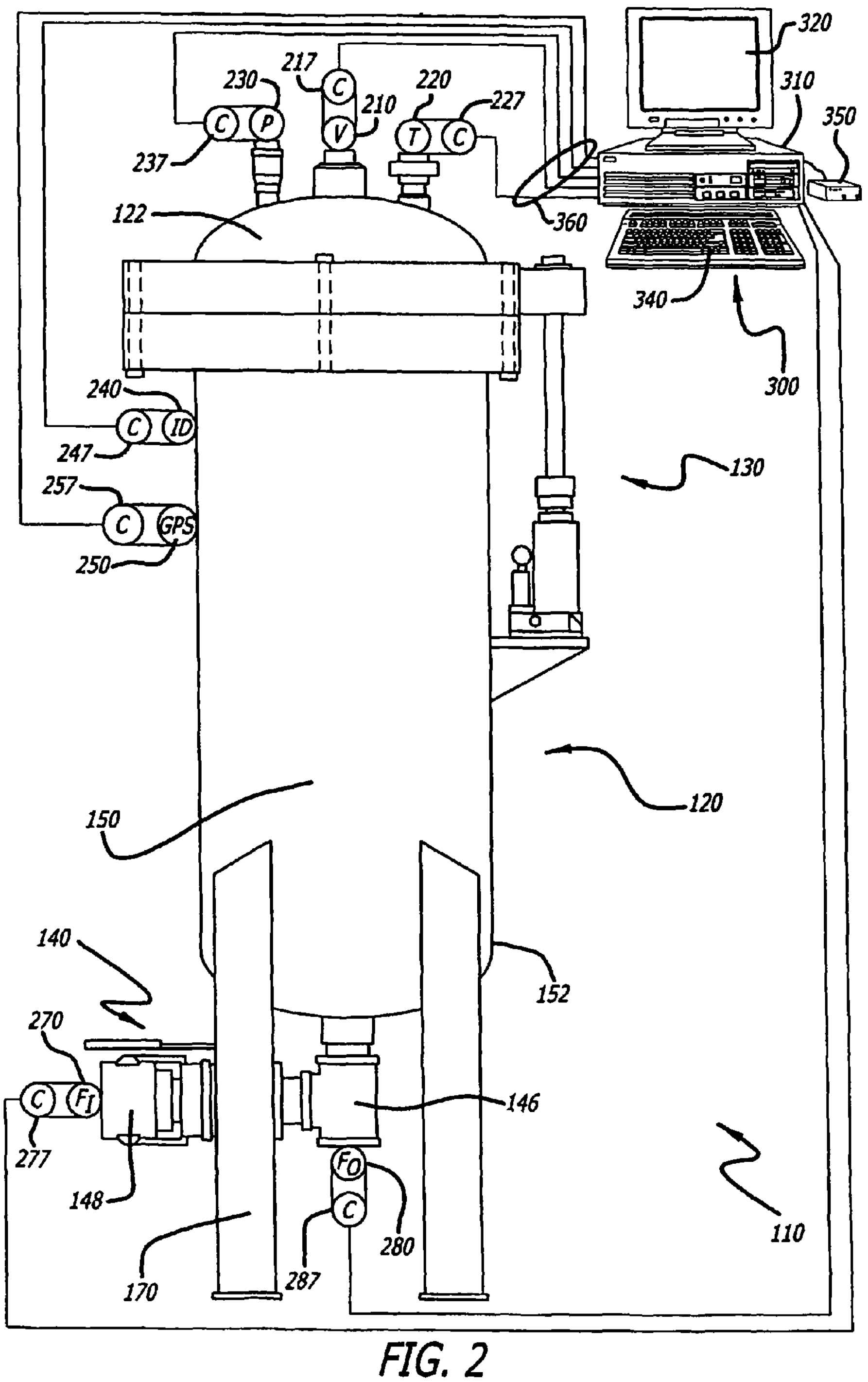
FIG. 2 is a side plan view of the intelligent material transfer subsystem of FIG. 1, wherein the instrumentation has been adapted for connection to a computer, microprocessor or other data processing system.

Referring now to FIG. 2, some of the instrumentation shown in FIG. 1 has been adapted for connection to a computer, microprocessor or other data processing system 300. For example, the volume or level sensor 210 is associated with a computer connection 217, the temperature sensor 220 is associated with a computer connection 227 and the pressure sensor 230 is associated with a computer connection 237. Similarly, the RFID device 240 has a computer connection 247, and the GPS device 250 has a computer connection 257. Likewise, inlet and outlet flow sensors 270 and 280 include computer connections 277 and 287. As described with reference to FIG. 1, any of the sensors (such as system time and material weight) shown therein or described regarding instrumentation suitable for such a material transfer system may be connected to the data processing system 300.

A data processing system 300 of the automated material transfer system 110 may take many configurations suitable for retrieving the data from the various instrumentation, processing of data to provide alarms, time and date information, event information, fault data, financial data, calculation of fluid and other properties associated with the refillable material vessel 120. The computer control system typically will include a processor 310 or similar computing device, a display device 320 and an operator input device 340. The computer system may further include a modem 350 or other connection(s) for integrating the automated material transfer system to a remote monitoring system, an intranet, the Internet or other system. In addition, the automated material transfer system shown in FIGS. 1 and 2 may require a separate power source, such as alternating current (AC) or direct current (DC), for example, local batteries. It will be appreciated by those of ordinary skill in the art that each of the individual instrumentation may have its own internal power source, such as a battery, or may be connected to a central or external power source.

Figure 3:
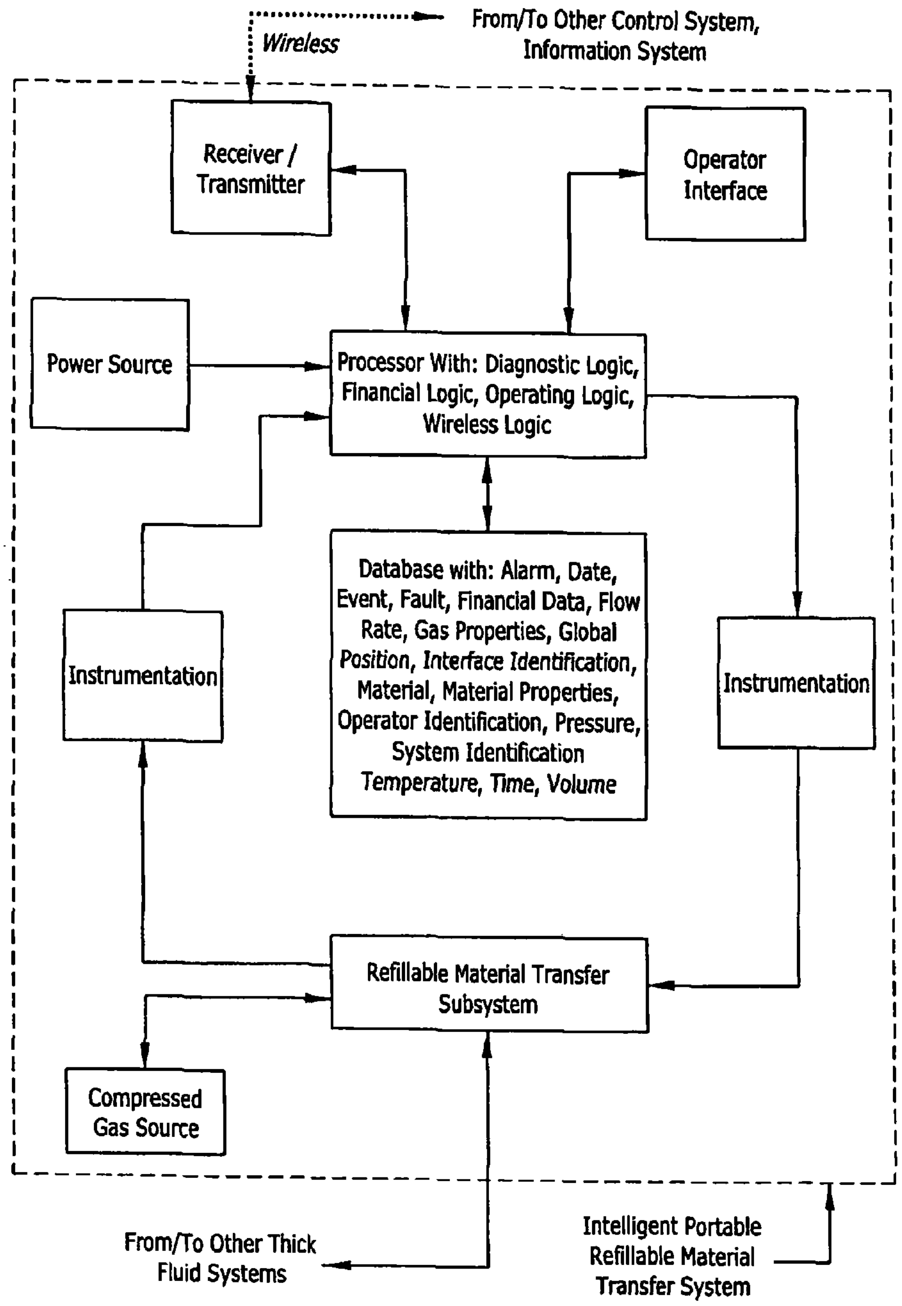
FIG. 3 is a block diagram representation of an intelligent material transfer subsystem of the present invention.

As shown in FIG. 3, the processor 310 (FIG. 2) may include diagnostic logic, financial logic, operating logic and wireless logic. The processor may be associated with random access memory (RAM), read only memory (ROM) and other data storage devices. The data processing system may also comprise a more simpler device, such as a data logger with ability to retrieve data stored in such a device with minimal processing capabilities. The data processing system may further include an analog-to-digital (A/D) and/or digital-to-analog (D/A) interface 360 (FIG. 2), and some instrumentation may connect directly to the processor via USB or other communication devices. It will be appreciated by those of ordinary skill in the art various configurations of the instruments, processors, data logger, memory devices, modems and other devices shown in FIGS. 1 through 4 may be altered to achieve the complexity or simplicity of a desired refillable (for example, intelligent and/or portable) material (thick or otherwise) transfer and dispensing system in accordance with the present invention.

Figure 4:
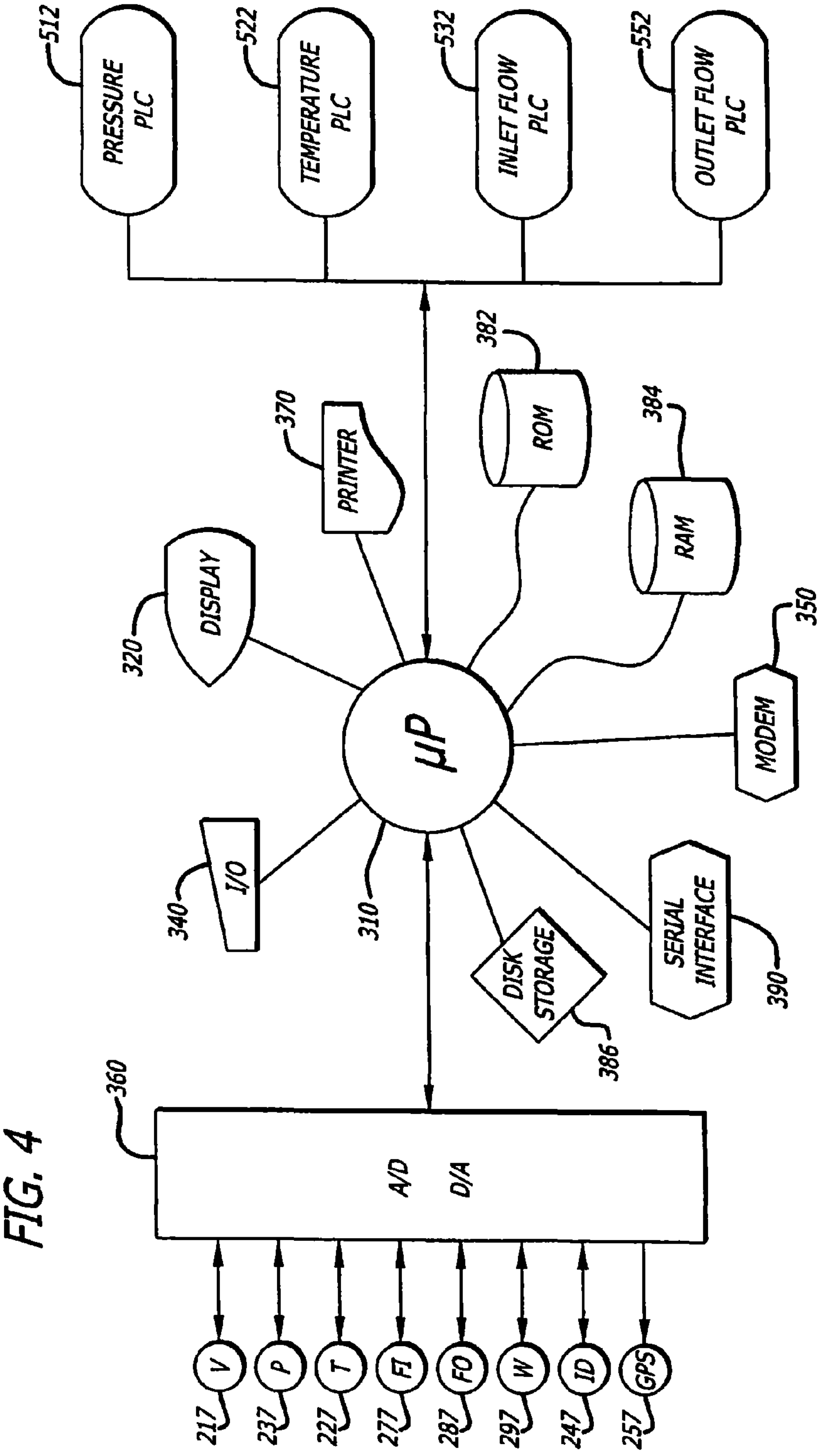
FIG. 4 is a schematic representation of an intelligent material transfer subsystem of the present invention.

Referring now to FIG. 4, various configurations of a microprocessor based distributed data acquisition system 300 may be implemented in accordance with the present invention. For example, the microprocessor 310 may be configured with a display device 320, input/output device 340 and printer 370. Various configurations of the input/output device, such as a keyboard, keypad, touch screen, personal device assistant (PDA) and other electronic and mechanical devices are contemplated by the present invention. Likewise, the operator display may be a conventional cathode ray tube (CRT), plasma, liquid crystal diode (LCD), light emitting diode (LED) or other known or yet to be developed operator interface systems that can provide a graphical, textual or other display capability. Likewise, the printer system may be a conventional dot matrix, laser or thermal paper apparatus. The data acquisition system may include electronic storage devices 386, such as removable diskettes, compact disks (CD), digital video disks (DVD), laser disks and other such data storage mediums. The microprocessor may have other storage capabilities, such as read-only memory (ROM) 382 and random access memory (RAM) 384. The microprocessor may have serial (for example, USB) and parallel (for example, RS-232) interface connections 390 for connecting to intranets, the Internet, broadband, cable and other systems. The microprocessor may also be connected to a modem 350 for wireless, phone line, broadband, cable and other connections.

The microprocessor 310 and other aspects of the present invention may be configured with external or local alternating current (AC), direct current (DC) or other power supplies (not shown). The microprocessor may also interface with an analog-to-digital (A/D) and digital-to-analog (D/A) 360 device for interfacing with the various volume, pressure, temperature, flow and other sensors and instrumentation 217, 237, 227, 277, 287, 297, 247, 257 as heretofore described. Alternatively, such devices as the RFID 247 and GPS 257 may connect directly to the microprocessor via a USB or other interface. The microprocessor may also be configured to interface directly with programmable logic controllers (PLC) 512, 522, 532, 552 for regulating pressure, temperature, flow and other process parameters. Alternatively, the microprocessor may connect with the programmable logic controllers or other control devices through the A/D and D/A converter.

Figure 5:
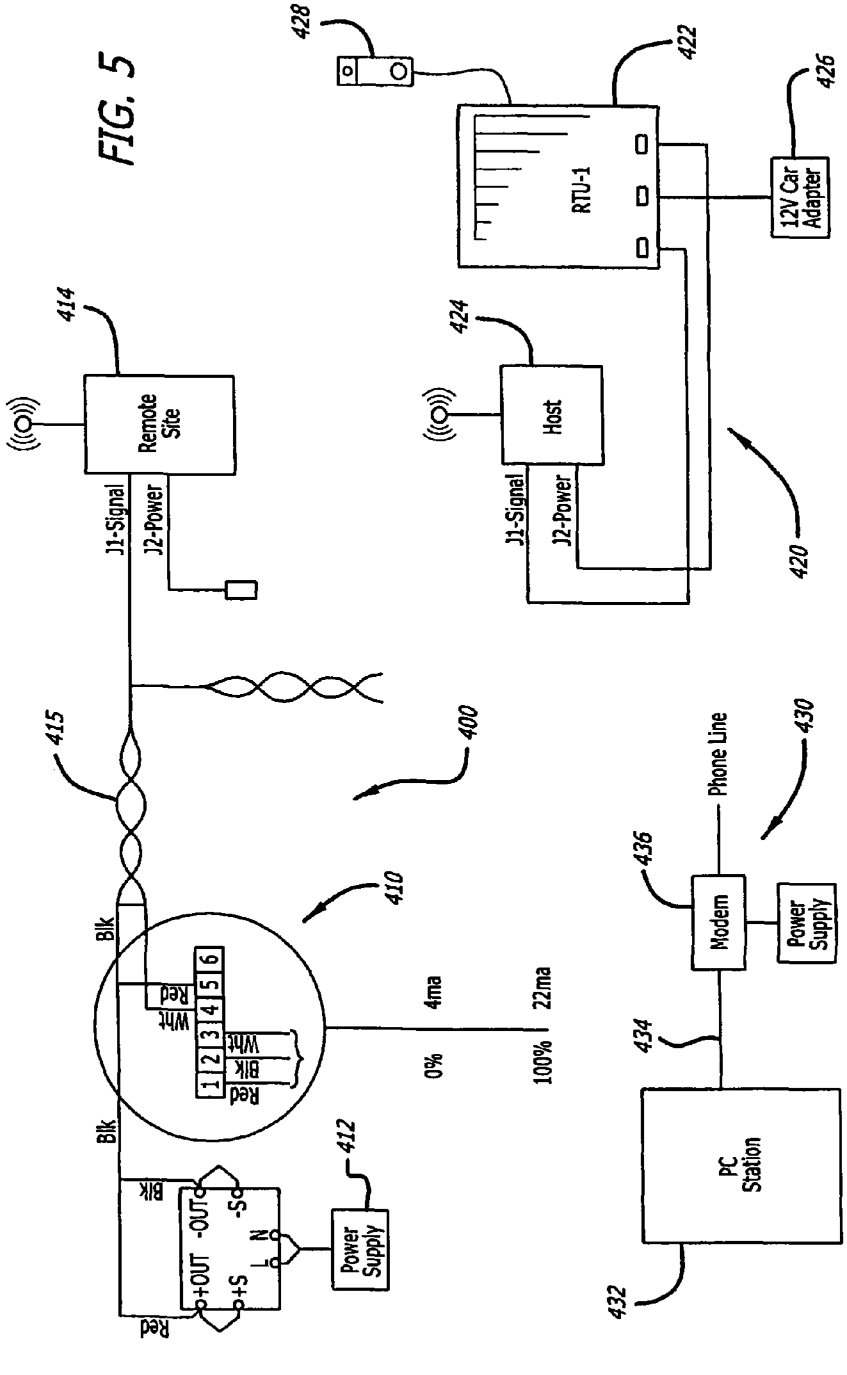
FIG. 5 is a partial wiring diagram for an embodiment of an intelligent material transfer subsystem of the present invention having a wireless connection.
Figure 6:
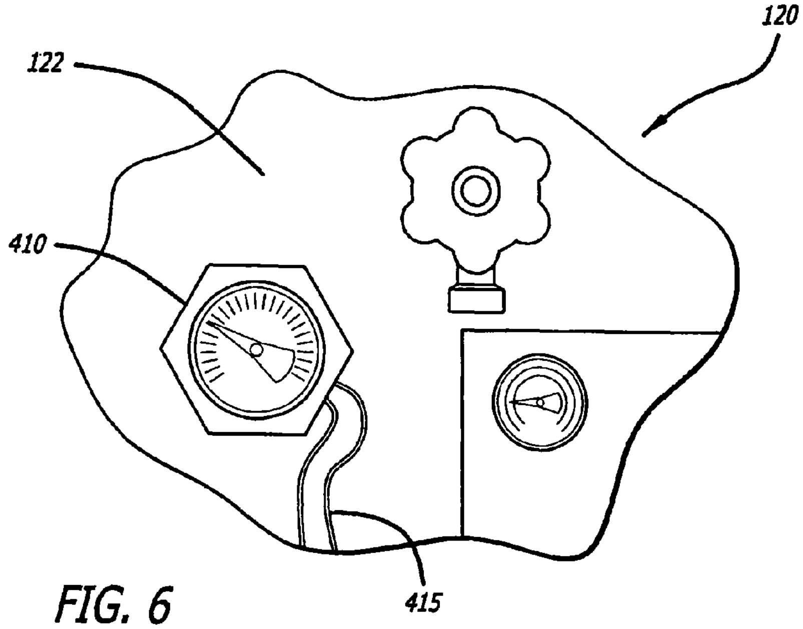
FIG. 6 is a schematic representation of a level gauge having a dial and an electronic encoder from a prototype of one embodiment of an intelligent material transfer subsystem of the present invention.
Figure 7:
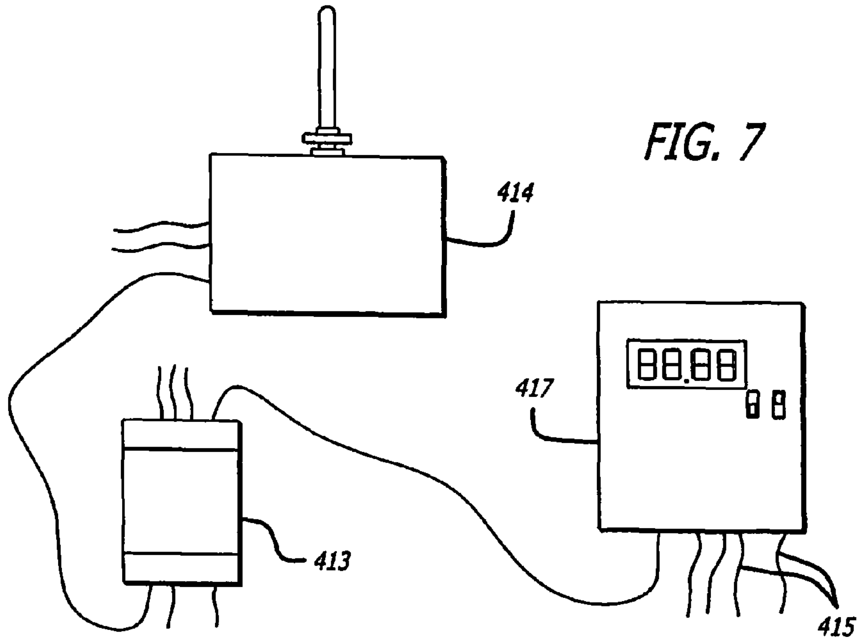
FIG. 7 is a schematic representation of a signal transmitter, signal conditioner and RF transmitter for use with the prototype of FIG. 6.

One embodiment (prototype) of an intelligent material transfer system 110 of the present invention is shown in FIGS. 5, 6 and 7. As shown in FIG. 5, a remote unit 400 includes a level sensor 410 having an external power supply 412. The level sensor is connected to a transmitter 414 for sending the level signal and an identification signal to a host unit 420. The host unit includes a data logger 422 operably connected to a receiving unit 424 for obtaining the level and identification signals from the remote site transmitter 414. The host unit further includes a power source 426 that may be configured for use with a cigarette lighter or other 12 volt source to allow the host unit to be mobile (in a car, truck, etc.). Further, the host unit includes a cell phone 428 or other broadcast device connected to the data logger for transmitting data obtained from the remote unit and retained in the data logger. The connection between the receiving unit 424 and the data logger may be via serial connections (such as USB) or parallel connections (such as RS-232).

As shown in FIG. 6, the level sensor and encoder 410 may include a dial and may be mounted on the top 122 of the refillable material vessel 120. The level sensor may be connected to the remote transmitter 414 via standard electrical wires 415 or other suitable connections. As shown in FIG. 7, the signal from the level encoder may be connected to a signal transmitter (LP Gas Stationary Tank Monitor) 417 having a 0-5 volt signal that is converted to a 4-20 milliamp signal by a signal conditioner 413 (Omega) that feeds the RF transmitter 414. Each of the remote unit and host unit devices may be standard “off the shelf” components. Alternatively, custom devices may be configured and packaged into a single unit for the remote and host units.

Referring again to FIG. 5, a computer processing system 430 of the present invention includes a standard personal computer (PC) station 432 connected via serial cable 434 to a phone line modem 436. In operation, the automated material transfer system 110 was positioned several miles from the local computer system 430. The remote unit 400 was activated such that the amount of fluid in the vessel 120 was detected by the level sensor 410 and sent via transmitter 414 to a receiver 424 of the host unit 420, which were operable in an automobile. Data was periodically sampled and stored in the data logger 422, transported, and transmitted via cell phone 428 to the central processing system 430. At the local site of the central processing system, the PC 342 was activated to initiate the modem 436 to pick up the signal from the host unit 420. The central processing system’s PC was configured to include software to retrieve the data signals via the modem line and process the data for display on the operator interface associated with the computer processing system.

As shown in FIGS. 5-7, a prototype of the automated material transfer system of the present invention was configured with a personal computer (PC) to acquire and manage data from a remote refillable material vessel. The prototype system acquired and managed the data with wireless communication links from a refillable material vessel positioned at a remote location where there were theoretical barriers to data acquisition, including minimal access, minimal power, no wiring, no land lines, no cellular coverage, physical (line-of-sight) barriers to long range radiofrequency (RF), and/or insufficient cost justification for a satellite link. The prototype mobile data acquisition system included components (RF receiver, and data logger with a modem) that received the data through wireless systems, stored the data, and transmitted the data through wireless systems.

The data from a level device configured to work with a refillable material vessel was transmitted through a wireless system to a mobile data logger operably connected to a modem or other transmission device. In this prototype, the vessel level data was stored on the datalogger and transported. The level data was transmitted from the data logger through wireless (RF) devices, a cellular phone and land phone lines to a personal computer (PC) having a modem. The software on the PC received and managed the level data. The data acquisition system was configured to acquire the level of grease in a cylinder (vessel) with wireless data transmission, transporting data between coverage areas of cellular phone systems with a vehicle, and tracking grease usage over time. During testing of the prototype, the cylinder identification and level signal was successfully transmitted from a first location via an RF signal through air to a vehicle outside the first location, then from the vehicle through a cell phone to a computer at a second location. Several transmissions were completed and the data tabulated on the computer.

The RF components outperformed design specifications by transmitting from inside the top collar of the cylinder, and with metal doors at the first location closed, through the concrete wall to the vehicle outside. The transmitted electronic level signals were obtained from a 250 gallon horizontal oil tank. As shown in FIGS. 5-7, a dial/electronic encoder replaced an existing float gauge, and a signal transmitter (“LP Gas Stationary Tank Monitor”) and signal conditioner (“Omega”) sent the signal to the RF transmitter (black box). Advantages of reapplying these pre-engineered “propane” components include that they simply piggy-back on most float gauges, and are already intrinsically safe and UL listed for hazardous environments, which may be present in an application where oil is dispensed.

As will be appreciated by those of ordinary skill in the art, the type of data acquired, level transmitter, wired communication link between the level transmitter and RF transmitter, and power sources may be configured with various alternate devices and systems. The land line could be removed, without altering the basic scope of the invention. The RF transmitter may be configured amongst a range of frequencies, wherein 50 MHz is low, enabling communication through some physical barriers. In such a system the power consumption (less than 50 μA between readings) is low.

Figure 8:
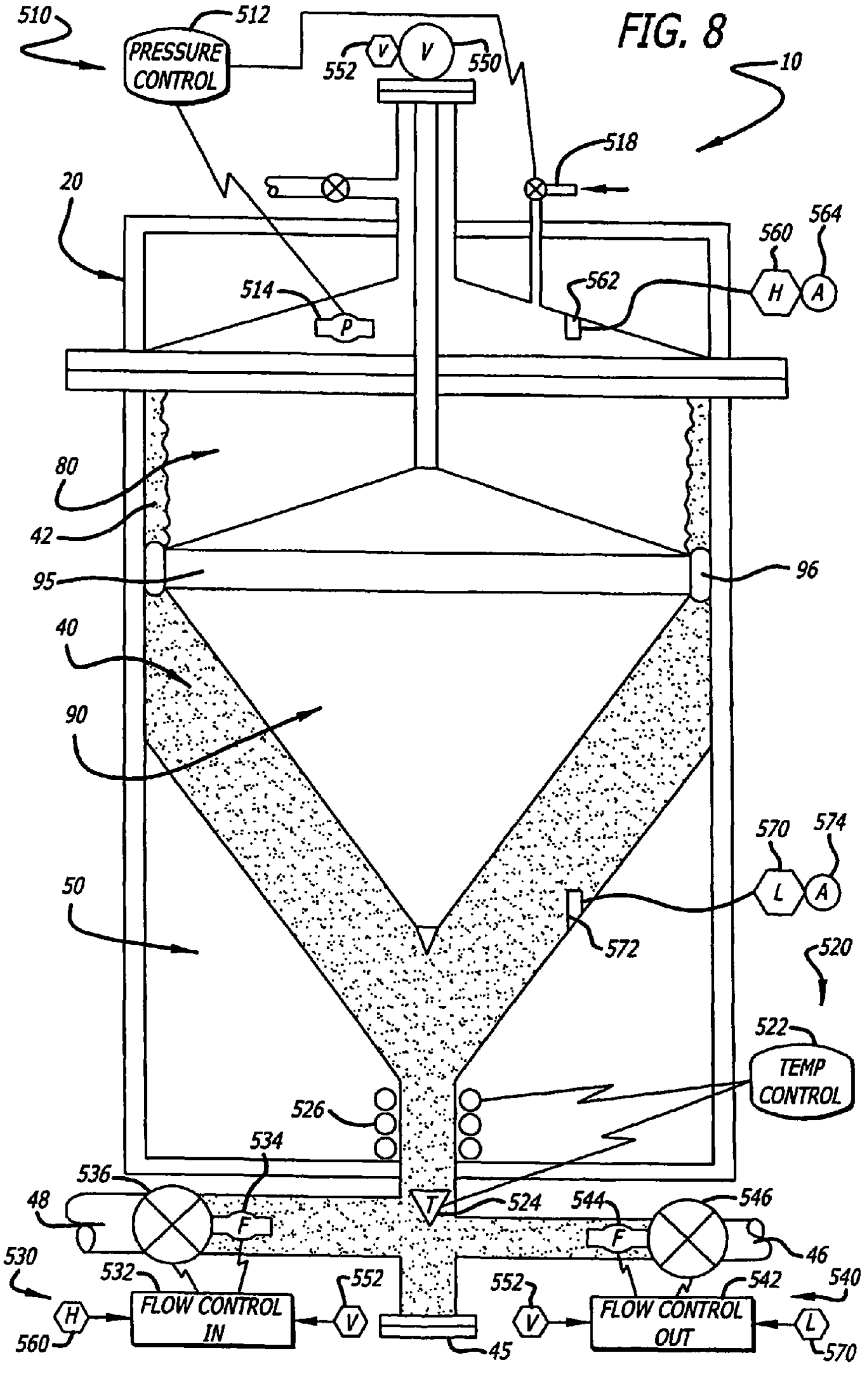
FIG. 8 is a front plan view in partial cross-section of an intelligent material transfer subsystem of the present invention having a plurality of discrete control systems shown in schematic representations.
Figure 9:
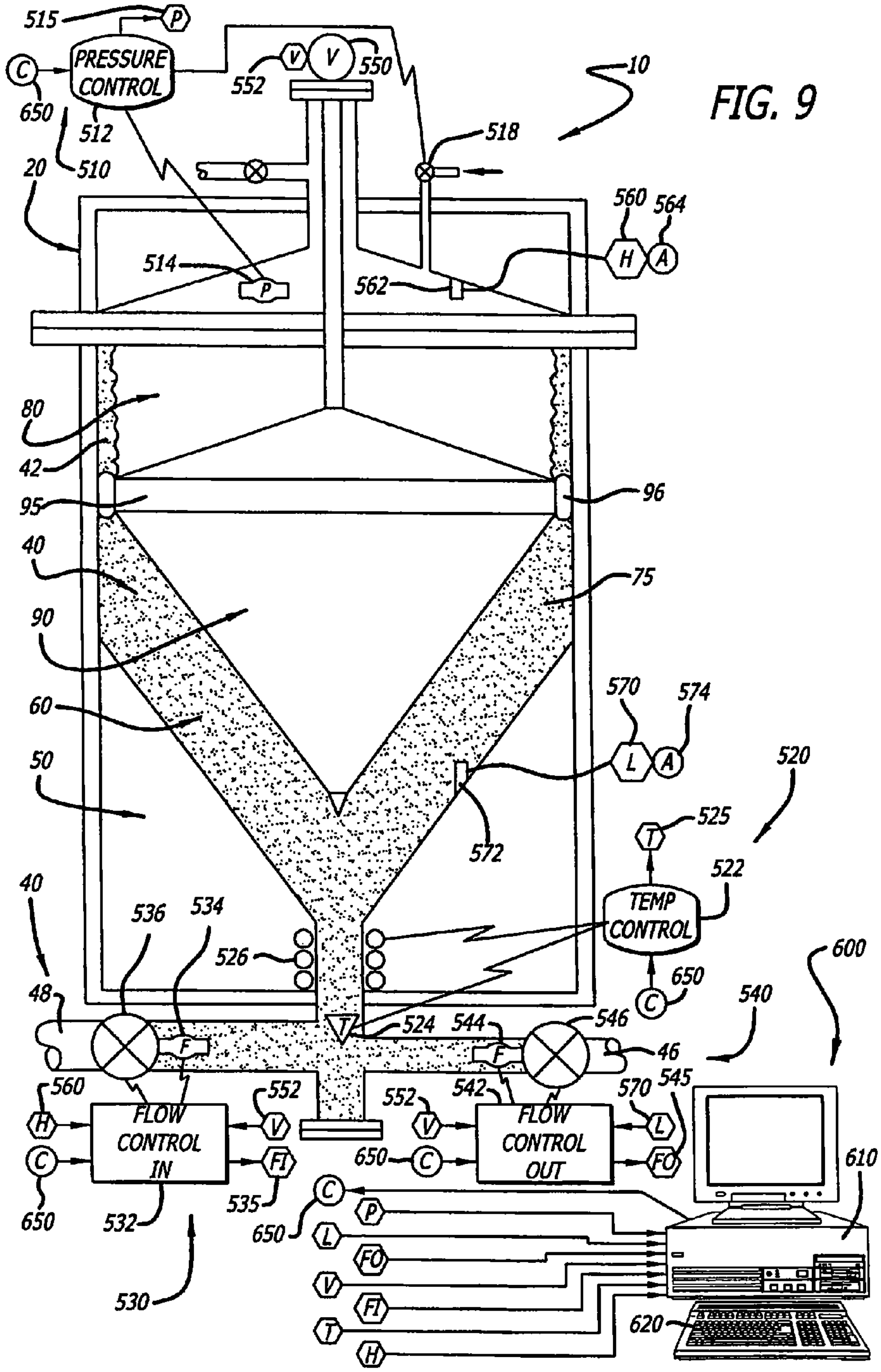
FIG. 9 is a front plan view in partial cross-section of an intelligent material transfer subsystem of the present invention having a plurality of control systems integrated with a computer control system shown in schematic representations.
Figure 10:
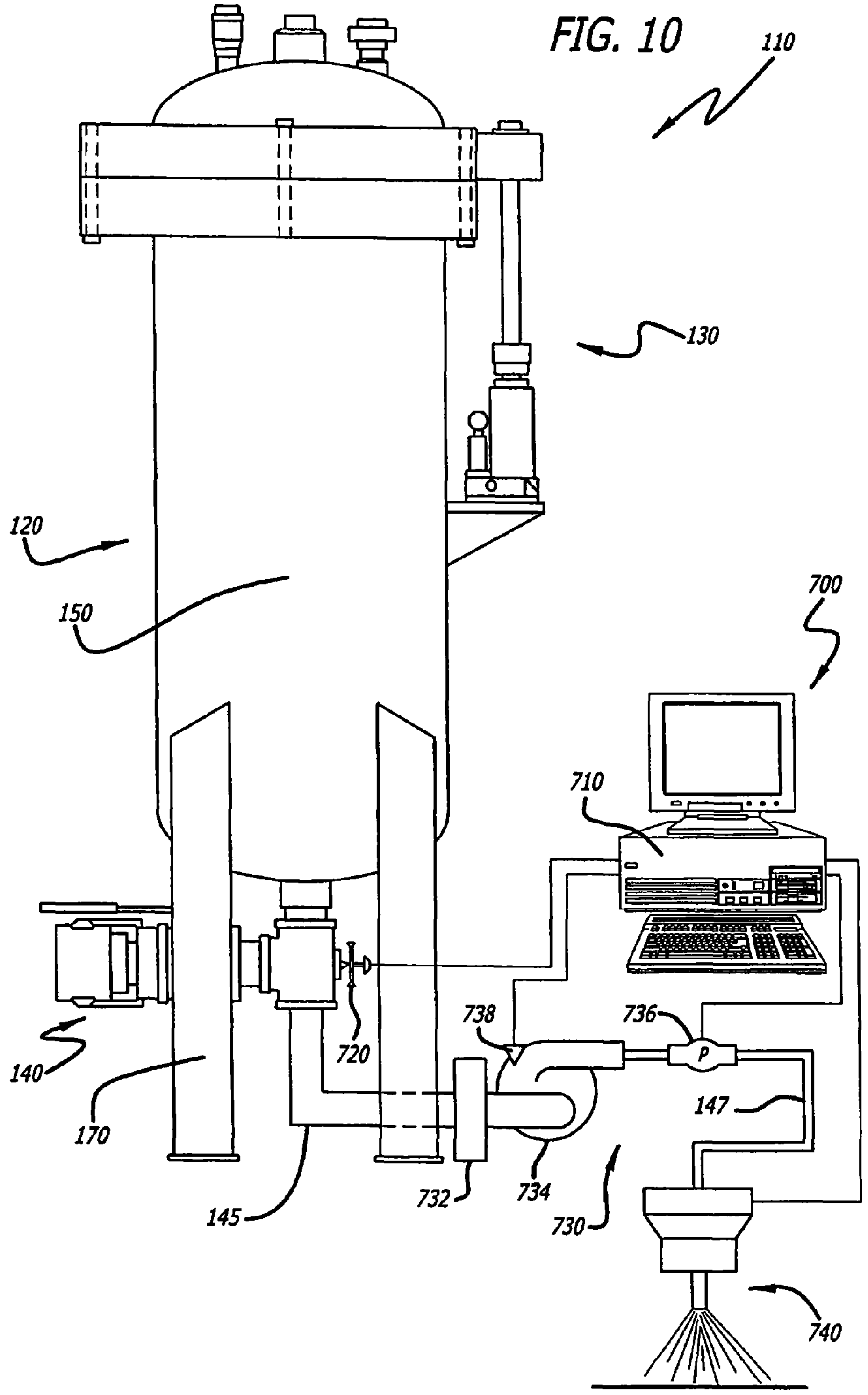
FIG. 10 is a side plan view of a refillable material transfer subsystem of the present invention integrated with a pump system, an applicator apparatus and a computer control system shown in a schematic representation.

Referring now to FIGS. 8-10, the intelligent material transfer system 10 of the present invention may be configured to automate and control a refillable material vessel 20. The refillable material vessel and its compressed gas source can be portable. The control system may also link and communicate with another automated material transfer systems and with other control and information systems. The automated material transfer system includes a control device, database, instrumentation, operator interface, power source, processor, and receiver/transmitter. The processor includes logic for diagnostic, financial, operating, and wireless data. The power source includes portable sources, such as battery and photovoltaic (PV), and the receiver/transmitter includes wireless communication, such as radio frequency (RF). The data includes information from a control system database and another control systems and information systems. The data includes, but is not limited to, alarm information, dates and times, events, faults, financial data, global position, interface identification, system identification, material identification, operator identification, material properties, gas properties, flow rates, pressure, temperature, and volume.

The control systems of the present invention allow a refillable material vessel to be a fully automated portable system. The control system may be self-powered, self-controlled and constantly linked with other control systems and information systems. The control system can initiate communication with another control system and/or information system, such as those for filling, transporting, inventorying, transferring, monitoring and controlling refillable material vessels and other containers. Example communications include, "Container #1 OK.", and "Help! I'm LASD Container #1, its noon, 1-27-05, and I'm empty, cold, and lost at GM in Warren, Mich.!".

The high levels of automation and communication of the present invention were previously unavailable with commercial refillable material transfer system technology. The control system and its components are preferably small and light, including miniature electronic components, relative to the refillable material transfer system, to be portable. The control system components preferably have a low cost and low energy consumption, including miniature electronic components, to be practical. Currently available devices may perform the various functions of the control system. The high levels of automation and communication for the control system of the present invention convert the refillable material vessel into a fully automated portable system.

Referring now to FIG. 8, the intelligent material transfer system 10 includes a vessel 20 having a force transfer device 90 contained within a fluid space 40 and gas space 80. The vessel further includes a false bottom 50 so as to constrain the material 42. The force transfer device further includes a tangential element 95 and stabilizers 96. Fluid may be transferred into and out of the container via a manifold 45, having inlet piping 48 and outlet piping 46. In accordance with the present invention, various control systems may be associated with the automated material transfer system. For example, a pressure control system 510 may be associated with the upper portion of the vessel having a pressure control device 512, such as a programmable logic controller (PLC), connected to a pressure sensor 514 located within or on the vessel. The pressure control device is operably connected to a gas (two way) valve 518 configured in the top or lid of the vessel.

Similarly, a temperature control system 520 may be associated with the lower portion of the vessel 20. The temperature control system may include a temperature controller 522, such as a PLC or other control device, operably connected to a temperature sensor 524 located within the fluid manifold 45 or otherwise positioned to sense an appropriate portion of the fluids temperature. The temperature controller is further operably connected to a heat transfer (heating and/or cooling) coil 526 or other mechanism for imparting thermal, kinetic or other energy to the fluid. The temperature controller may be connected to one or more temperature sensors located proximate the heating coil, in the material inlet conduit 48, the material outlet conduit 46 or any other desired location within the material manifold 45. The pressure and temperature control systems of the automated material transfer system 10 of the present invention may include local operator interfaces, such as displays and keyboard inputs for monitoring the pressure and temperature, as well as providing control set points and other data or alarm points to the controllers. Likewise, the controllers may include operator alarms, shut off mechanisms and other features known to those of ordinary skill in the art.

The intelligent material transfer system 10 of the present invention may include other control devices, such as programmable logic controllers and programmable recording controllers (PRC) to control various aspects of the material transfer system regarding sensors as shown in FIGS. 1 and 2. For example, an inlet flow control system 530 may be associated with the fluid (material) inlet manifold 48. The inlet flow controller may include a control device 532 associated with a flow sensor 534 positioned within the inlet piping or other conduit. The flow controller also is operably connected to an inlet flow valve 536. Similarly, a flow outlet controller 540 may be associated with the outlet manifold 46. The outlet controller may include a flow control unit 542 operably connected to a flow sensor 544 and flow outlet valve 546 positioned within the outlet piping or other conduit. In accordance with the present invention, the flow controllers may include operator input devices or interfaces for connecting to configuration devices. Likewise, the flow controllers may include visual displays of the flow sensor information, as well as alarms and other data or processed information.

The material transfer vessel 20 may be further configured with a high level sensor system 560 and a low level sensor system 570. The level sensor systems may be configured with sensors or switches 562, 572 and alarm indicators or displays 564, 574. The high and low level sensors may be operably connected to the flow inlet and flow outlet controllers 532, 542 so as to provide high fluid level and low fluid level shut off capabilities. For example, during a fill cycle, the inlet flow controller 532 may be configured to close the inlet flow control valve 536 when the high level sensor 560 detects that the force transfer element 90 has come into contact or otherwise activated the high level switch 562. At that time or alternatively, the high level sensor may activate the visual and/or audible high level alarm 564. Likewise, the outlet flow control unit 542 may be configured to close the flow outlet valve 546 when the vessel is in operation and the force transfer device 90 contacts or otherwise activates the low level switch 572. The low level system 570 may be configured to send a signal to the flow outlet controller and/or activate the alarm 574. In addition, a volume or level sensor 550 may be configured with an output 552 that may be integrated into the flow control systems for feed forward, feed back, shut off or other functions to be integrated into the flow controllers.

Referring now to FIG. 9, an automated computer control system 600 may be associated with the intelligent material transfer system 10. The computer control system includes a main computer controller 610, such as a microprocessor or other device for processing input data and providing output data. The computer control system may include ROM, RAM or other memory storage devices for maintaining data and processed information. The control system also includes a user interface 620, which may provide a graphical display, keyboard and other mechanisms for operator output and input. The system may be further configured with Internet, serial and parallel connections for integration into networks and communication with other control devices. For example, the pressure controller 512 may include an output 515 that is operably connected to the computer controller 610. The connection may be through an analog-to-digital interface (not shown), cabling, wiring or other suitable interface device. Similarly, the temperature controller 522, flow input controller 532 and flow output controller 542 may each include outputs 525, 535, 545 to regulate their respective process apparatus, such as flow valves. Each of the controller outputs 515, 525, 535, 545 may be operably connected to the computer controller. Similarly, volume sensor 550, high level sensor 560 and low level sensor 570 may be connected to the computer controller. The output from the computer controller 650 may be connected to the pressure controller, temperature controller and flow controllers to provide set points and other control or process information.

As shown in FIG. 3, the computer control system may include a processor with diagnostic logic, financial logic, operating logic, wireless logic and other processing systems for different levels of sophistication of computer control and data acquisition. The computer control system may also include a database having alarms, date information, events data, fault data, financial data and material properties such as flow rate, temperature, pressure volume as well as position information, identification, material properties, operator identification and other system and process variables. The computer control system will probably require an external power source, but may be self contained with battery or other AC/DC power sources. The computer system may also include a wireless modem or other device for connection into an intranet or internet system. The operator interface may be a graphical user interface or other digital display device. Analog controllers, recorders and display devices may be also associated with the computer control system of the present invention.

Referring now to FIG. 10, integrated material transfer and dispensing system 110 is configured with an automated control system 700 having a PLC, PRC, computer controller or other computer processing system 710. The material vessel 120 and fluid outlet manifold 140 are configured to feed through a pumping system 730 and/or an applicator system 740. Inputs to the process control system 710 may be configured as shown in FIGS. 8 and 9, and may include, but are not limited to, any instrumentation shown in FIGS. 1 and 2. Likewise, any other process control variables required for control of the pumping system 730 and/or application system 740 may be included as inputs to and outputs from the process controller 710.

Figure 11:
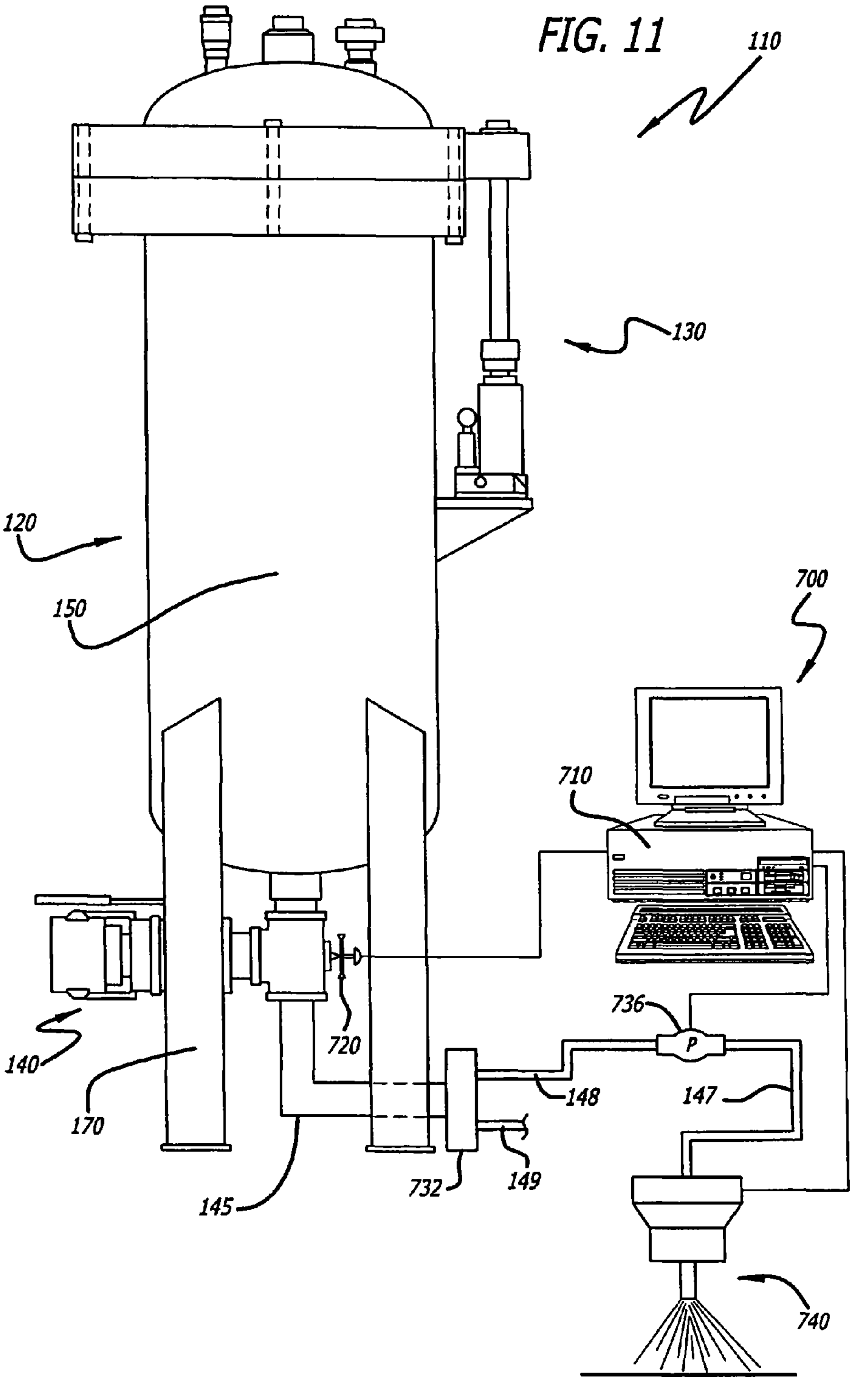
FIG. 11 is a side plan view of a refillable material transfer subsystem of the present invention integrated with at least one applicator apparatus and a computer control system shown in a schematic representation.

The integrated material control system 110 may be further configured with a fluid control valve 720 associated with the fluid inlet and outlet manifold 140. The computer controller 710 may be associated with the base and pedestal 170 of the vessel 120, or may be located remotely and operably connected to the instrumentation and control devices. Piping or conduits from the outlet of the fluid vessel 120 may be connected to the pumping system 730 and/or application system 740 by a variety of mechanisms. For example, the pipes or conduits 145 from the fluid vessel may be connected via a manifold 732 or directly to one or more pumps 734. Instrumentation such as from a pressure and/or flow sensor 736 may be fed back to the control system 710. Similarly, the control system may be connected to pump motor drive or controller 738 to operate the pumping mechanisms. Additional pipes or conduits 147 may provide fluid communication between the pumping system 730 and the application system 740. As shown in FIG. 11, the automated material transfer system 110, which may be configured as heretofore described regarding FIG. 10, may be connected directly to one or more applicators 740 via conduits or pipes 148, 149 without the need for intermediary pumps.

Such integrated material transfer systems may be used for providing oils, greases, mastics, sealants, elastomers and other materials such as liquid sound deadeners. Such materials may include, but are not limited to, thick fluids, viscous fluids, semi-solid fluids, visco-elastic products, pastes, gels and other fluid materials that are not easy to dispense. The fluid pumping system may include booster pumps in series or in parallel for the manifold. In addition, the applicator may include its own booster pumps or other drive mechanisms in addition to the pumping system 730. The applicator system may further include metering devices and local control devices that contain instrumentation that may be integrated into the computer control system 710 of the present invention.

Referring now to FIGS. 12-16, the automated material transfer system of the present invention may be configured in a complete assembled package, hereinafter called a "station." The automated station may be pre-mounted, pre-piped, pre-wired, pre-programmed, pre-configured, pre-calibrated, and pre-tested. The interfaces may be quick disconnects for the compressed gas, power, and thick fluid; and plug-and-play controls for data logging, flow, operation, pressure, and weight. The automated material transfer station may automatically deliver thick (high viscosity) fluid or other material from one or more refillable material transfer subsystems (for example, FIGS. 14A and 14B). The automated material transfer station may automatically receive and store material from other material systems, and automatically transfer this material to other systems, such as pumping systems and applicator systems. The automated material transfer station interfaces with other systems with minimal effort. The station is configured with one or more material transfer vessels that may be removed from the station when empty and replaced with vessels filled with material, such as LASD.

The general system components (FIG. 15) may include, but not limited to, the following:

(1) Skid, for supporting the system;

(2) Refillable and/or automated material transfer subsystems;

(3) Piping, for filling, pressurizing, and delivering thick fluid or other materials from the material transfer subsystems;

(4) PLC with touch screen, for controlling the system and data logging;

(5) Scales or sets of load cells, for measuring the material transfer subsystems and material weights;

(6) Other instrumentation and controls; and (7) Cabinet, for enclosing the entire system for protection and aesthetics.

Figure 12:
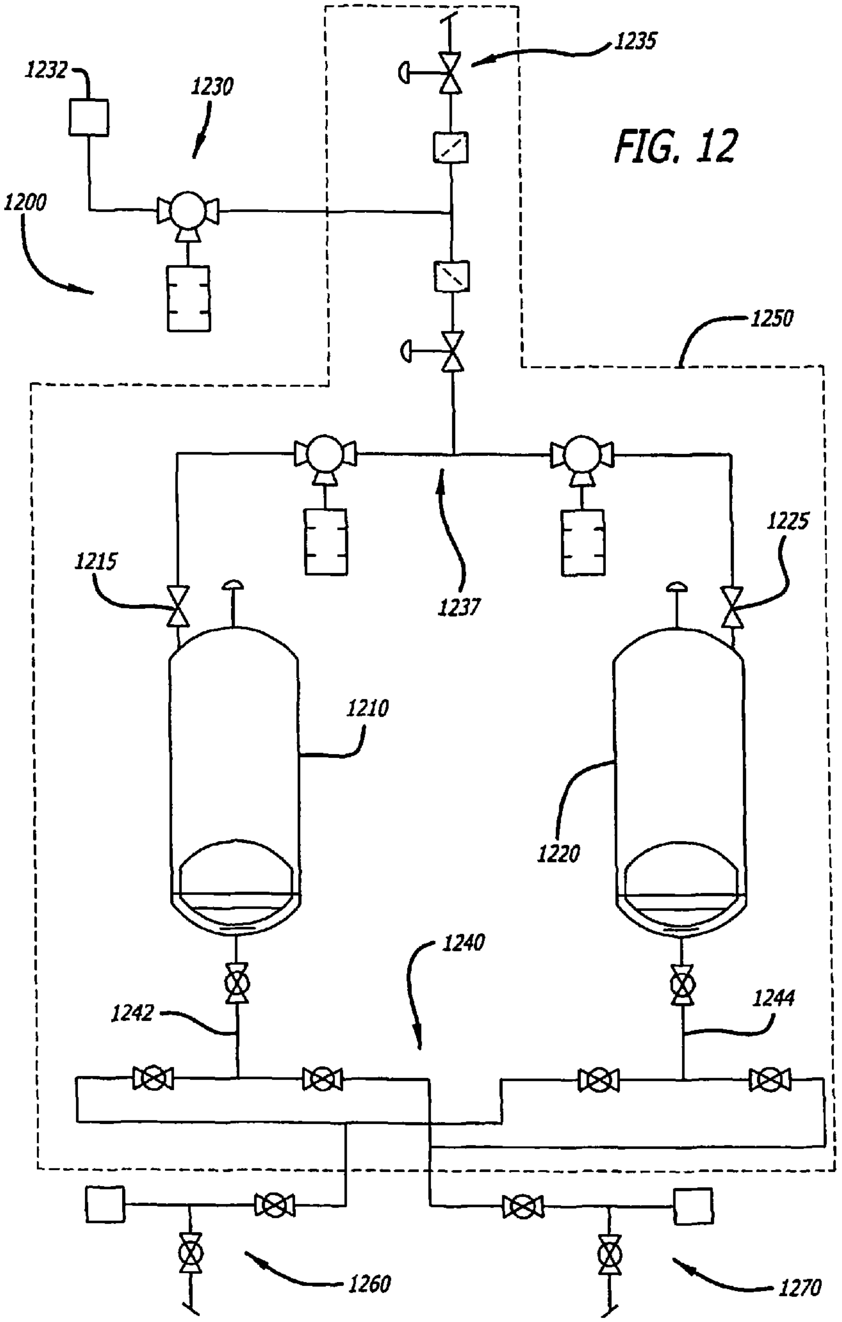
FIG. 12 is a piping and instrumentation diagram of two refillable material transfer subsystem of the present invention that may be configured with packaged controls for use in an automated material transfer station.

The automated material transfer station of the present invention is the first known material transfer system to be configured with a cabinet (climate controlled housing) and package process controls (FIG. 12). The automated station includes known or modified apparatus, such as scales and load cells, sources of compressed gas and/or power, automation devices and one or more material transfer subsystems, for example, automated, refillable vessels (containers). Several material transfer subsystems, pumping systems and applicator systems could be placed in series or parallel with one or more automated stations of the present invention so as to increase overall system capacity. Wireless interfaces may be added to the automated material transfer station to enable remote monitoring and/or control. Such system controls may be configured to automate the material delivery from the material transfer subsystems.

For one embodiment of the automated material transfer station (FIGS. 13A, 13B), the space envelope may be seven (7) feet in length by four (4) wide by seven (7) feet high; however, the system is scalable. Such a sized automated station may be configured with at least two refillable material transfer subsystems, each subsystem having about a thirty-five gallon flooded capacity. Further, the maximum allowable working pressure may be 150 psig, for operation with nominal 100 psig compressed air. The material transfer subsystems and piping (manifolds, conduits) should meet the applicable codes for pressure service.

Figure 16:
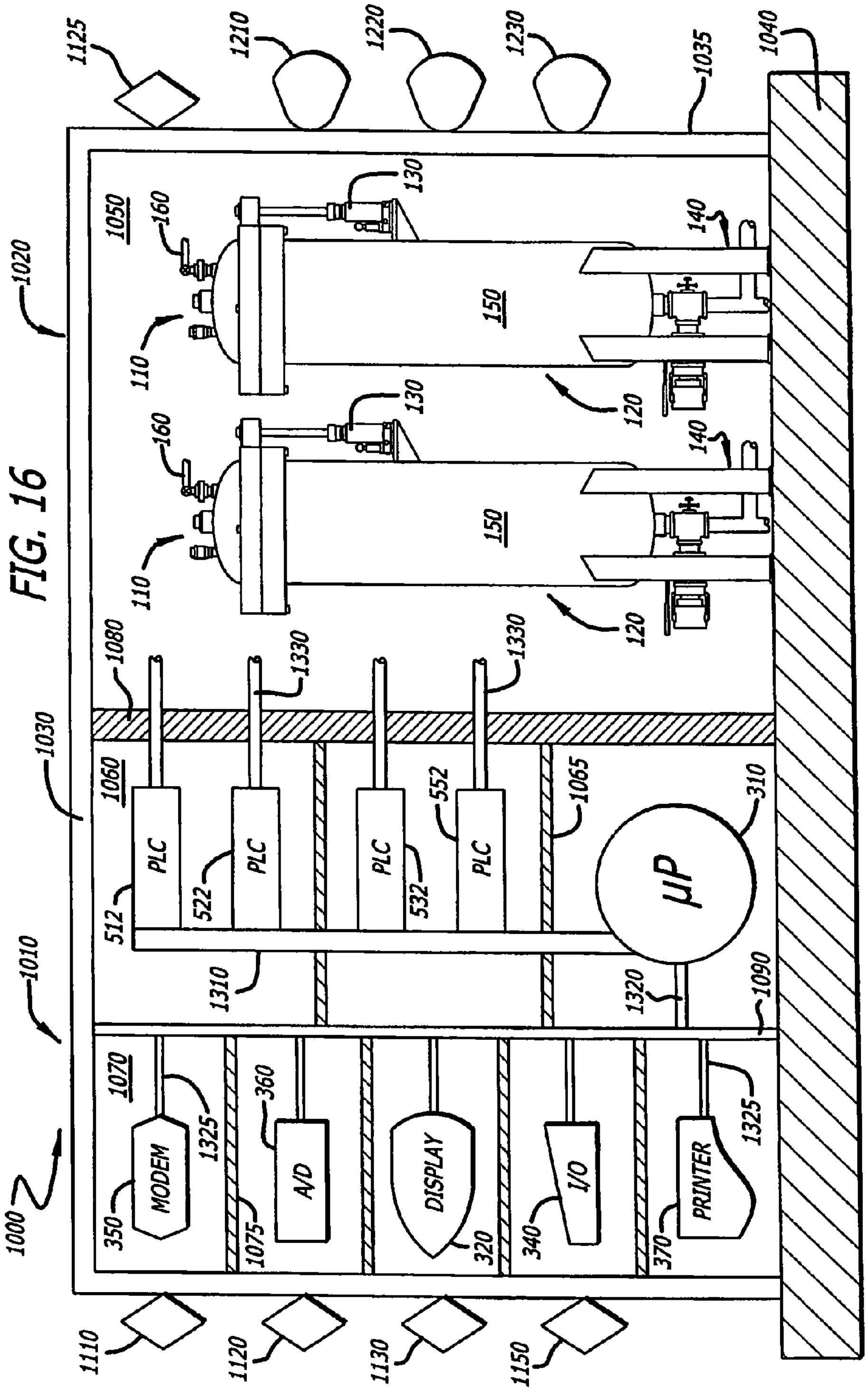
FIG. 16 is a schematic diagram representation of an automated material transfer station of the present invention.

Referring now to FIG. 16, one or more automated, refillable material transfer subsystems 110 of the present invention may be housed within a "cabinet" so as to provide a comprehensive automated material transfer station 1000. The automated station may be configured into a plurality of partitions including a control section 1010 and a material transfer section 1020. The automated material transfer station includes a housing having a cover 1030 and a floor and or skid-type configuration 1040. The material transfer station includes outer walls 1035, and may include one or more doors windows and other access ways, as appropriate. The automated transfer station is configured to be "plug and play," and may be moveable about an industrial manufacturing site, storage area, loaded onto the back of trucks, trailers or railcars, and otherwise moveable from place-to-place. Depending on the size of the containers and internal control component, the automated material transfer station may be a few feet tall and wide or configured with significantly larger dimensions. Accordingly, the automated station may be configured to be stationary within a warehouse, a factory and other working environments, or the automated station may be configured to be movable or portable from one desired location to another.

In the control section 1010 of the automated material transfer station 1000, it is contemplated that the control section will be divided into several compartments 1060, 1070 with shelving or other partitions 1065, 1075. Similarly, the material transfer section may be configured with a single compartment 1050, or may be divided into sub-compartments as appropriate. It is expected that a heating, ventilating and air conditioning (HVAC) system will be supplied to the automated material transfer station such that the control section may be cooled, heated or otherwise air-conditioned separately from the material transfer section. An insulated dividing wall 1080 may be constructed between the two sections so as to isolate the two temperature sections. Not shown in FIG. 16 are the heating, ventilating and air-conditioning ducts, compressors and other components. Such devices may be self-contained within the material transfer station or again "plug and play" to the HVAC system where the control station is positioned.

Referring to the control section 1010 of the automated material transfer station 1000, a first compartment 1060 may be configured to house a microprocessor 310 and multiple programmer logic controllers 512, 522, 532 and 552. These PLCs may be electronically or otherwise connected to the microprocessor via a control conduit 1310 or other suitable hardwired or wireless connections. The PLCs may be connected by multiple conduits, cabling, wireless connections 1330 to the instrumentation and other devices associated with the material transfer subsystems 10, 110, as shown in FIGS. 1, 2, 8 and 9. The microprocessor may further be configured to connect via a cabling conduit or wireless connection 1320 to a cabling tray or other conduit system 1090 so as to connect the microprocessor to a display system 320 and input output system 340, a printing system 370 and modem 350 having connections 1325 to the conduit system.

Further, the microprocessor 310 may be connected to an analog-to-digital (A/D) and/or digital-to-analog system 360. The A/D system may be connected to an outside conduit 1120 for receipt of signals from material transfer devices in same station, other stations or external devices such as pumps, spray devices and robots (see FIGS. 10, 11 and 18). The automated control station may further include a communication connection 1110 for connecting to the computer modem, to a phone line, data signals and wireless signals. The automated station may further include switches, controls and other operator interface devices 1130 located on the outside of the cabinet. The automated station also includes a power coupling 1150 for supplying AC and/or DC power. The automated station may also include its own power generating station and uninterruptible power supply.

The material transfer section 1020 of the automated material transfer station 1000 includes one or more refillable (intelligent, automated) material transfer subsystems 110 having vessels 120, lid lifting mechanisms 130, main bodies 150, fluid manifolds 140 and gas inlets 160. Although not fully described regarding this embodiment, the other features of the refillable material transfer systems described herein and incorporated by reference are applicable to this embodiment. The automated material transfer station may include outside couplings for gas inlet and outlet 1210, fluid inlet 1220, fluid outlet 1230 and other connections as appropriate. Instrumentation, such as pressure and temperature sensors, may be connected directly to the control system section or may be connected to an outside coupling 1125. Such a coupling may allow input and output data from other automated stations and remote devices within a manufacturing plant or other facility, for example, control systems for pumps, spray devices and robotics. Similarly, instrumentation signals coming from the material transfer section 1020 through the outside electric connection 1125 may be connected directly into the input electrical connection 1120 to the A/D device 360, which in turn may connect to the microprocessor 310 and logic controllers 512-552. Instrumentation and control devices located within the material transfer section 1020 and vessel compartment 1050 may be connected directly to the outputs from the logic controllers via cabling 1330 or other suitable systems, such as wireless connections (for example, radio frequency and microwave signals).

Figure 13A:
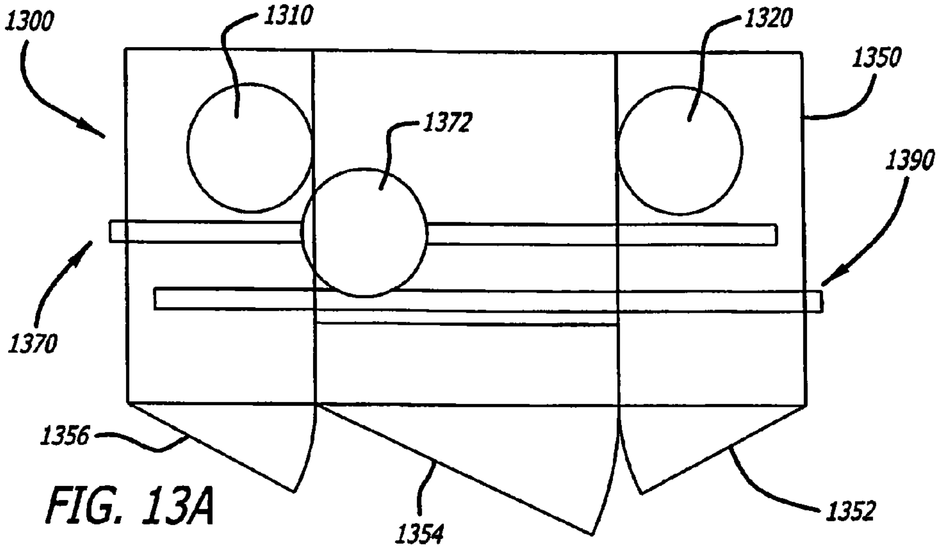
FIGS. 13A and 13B is a top view schematic and a side view schematic of an automated material transfer station of the present invention having two refillable material transfer subsystems and a control panel.
Figure 13B:
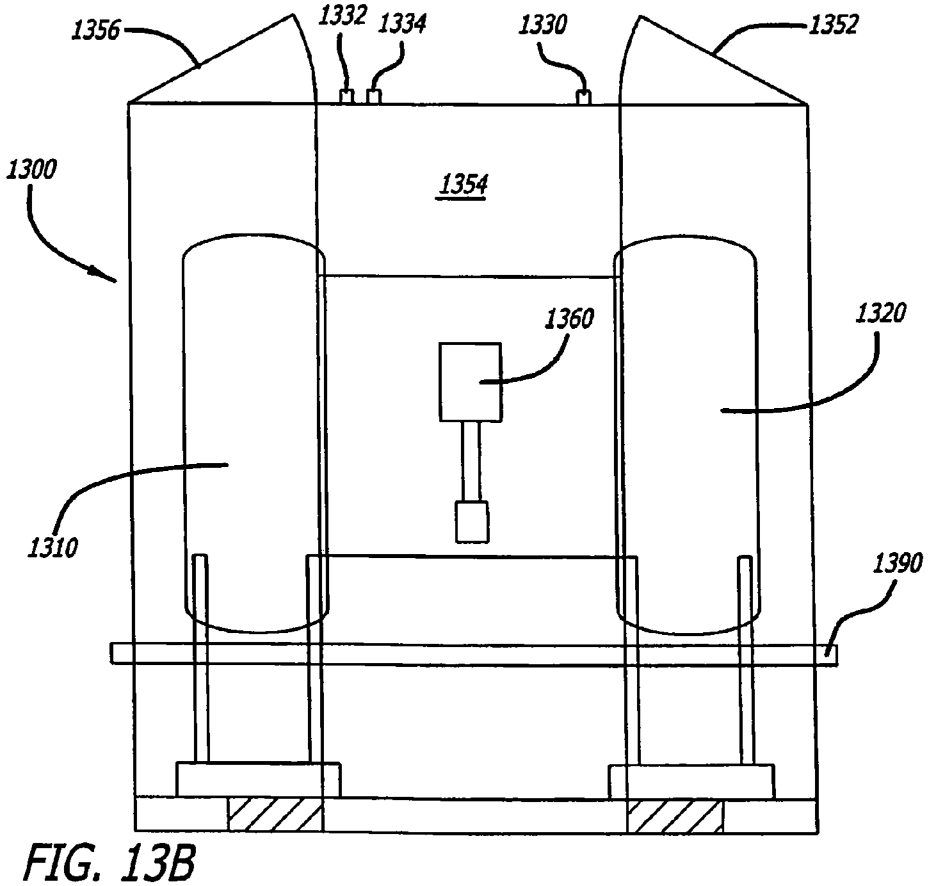
Figure 14B:
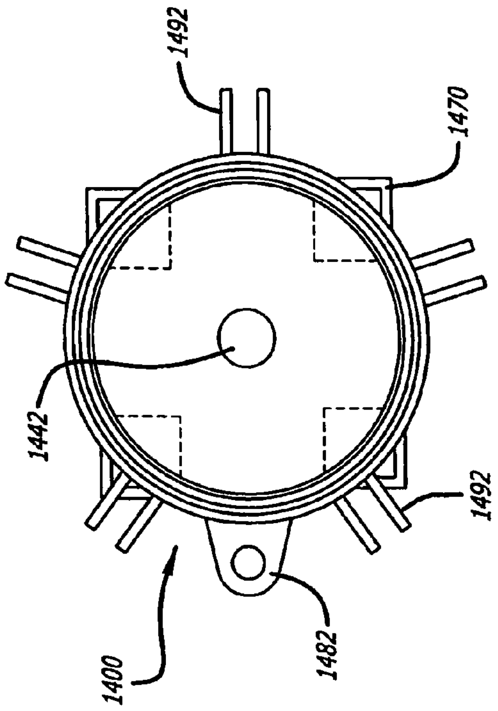
FIGS. 14A and 14 B are a side plan view and a top plan view of a refillable material transfer subsystem of the present invention configured with a removable lid and a force transfer device including a level indicator.
Figure 14A:
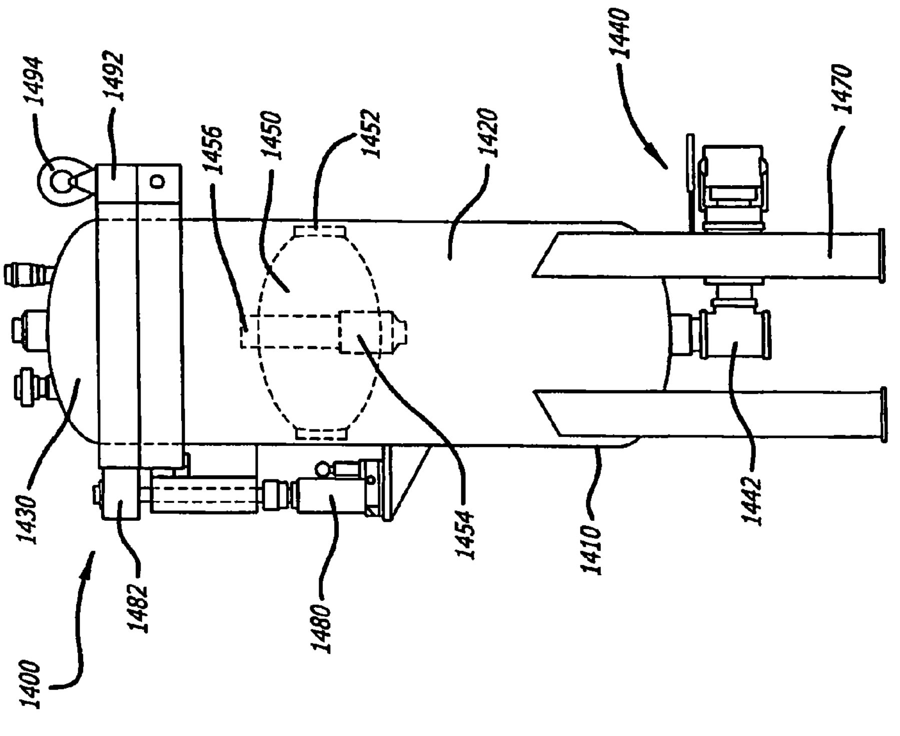
Figure 15:
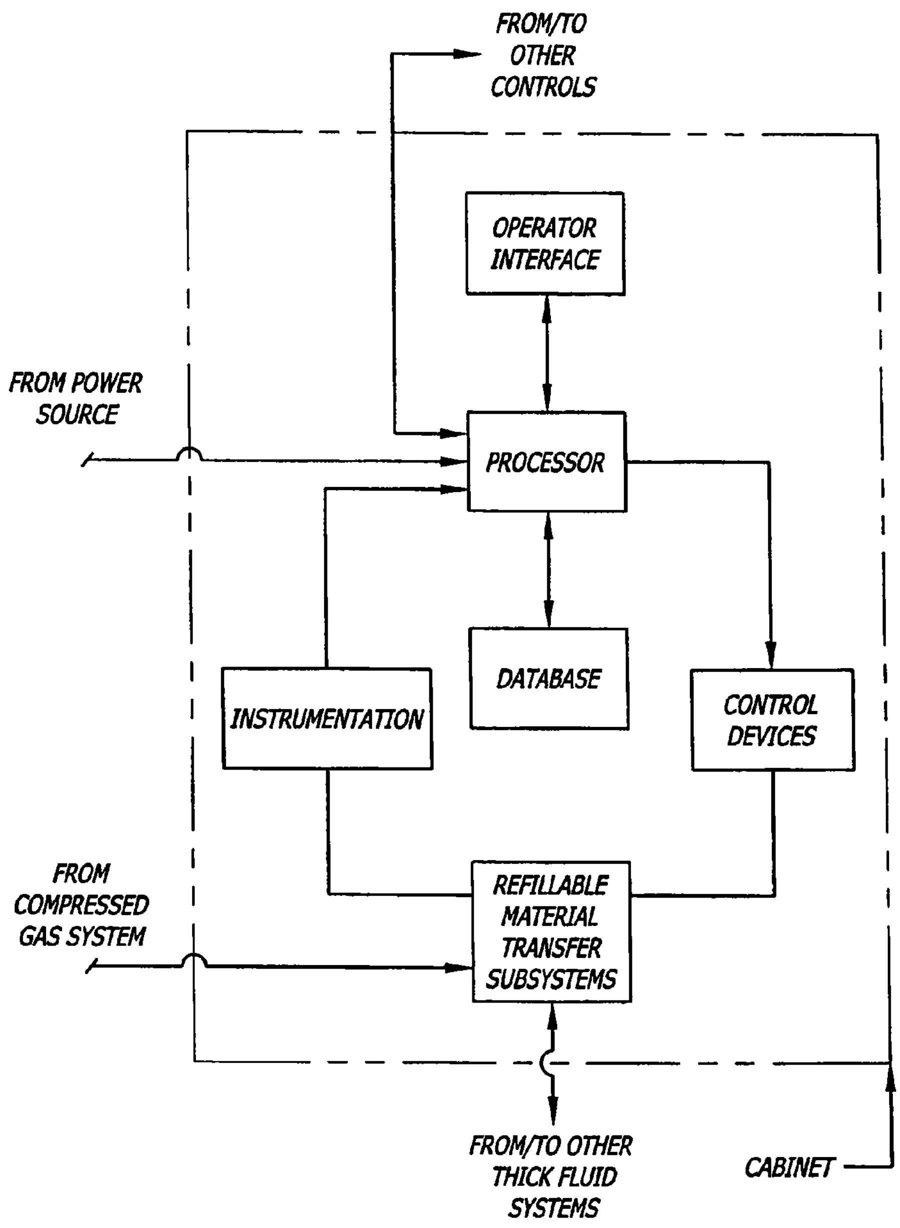
FIG. 15 is a block diagram representation of an automated material transfer station of the present invention.
Figure 17:
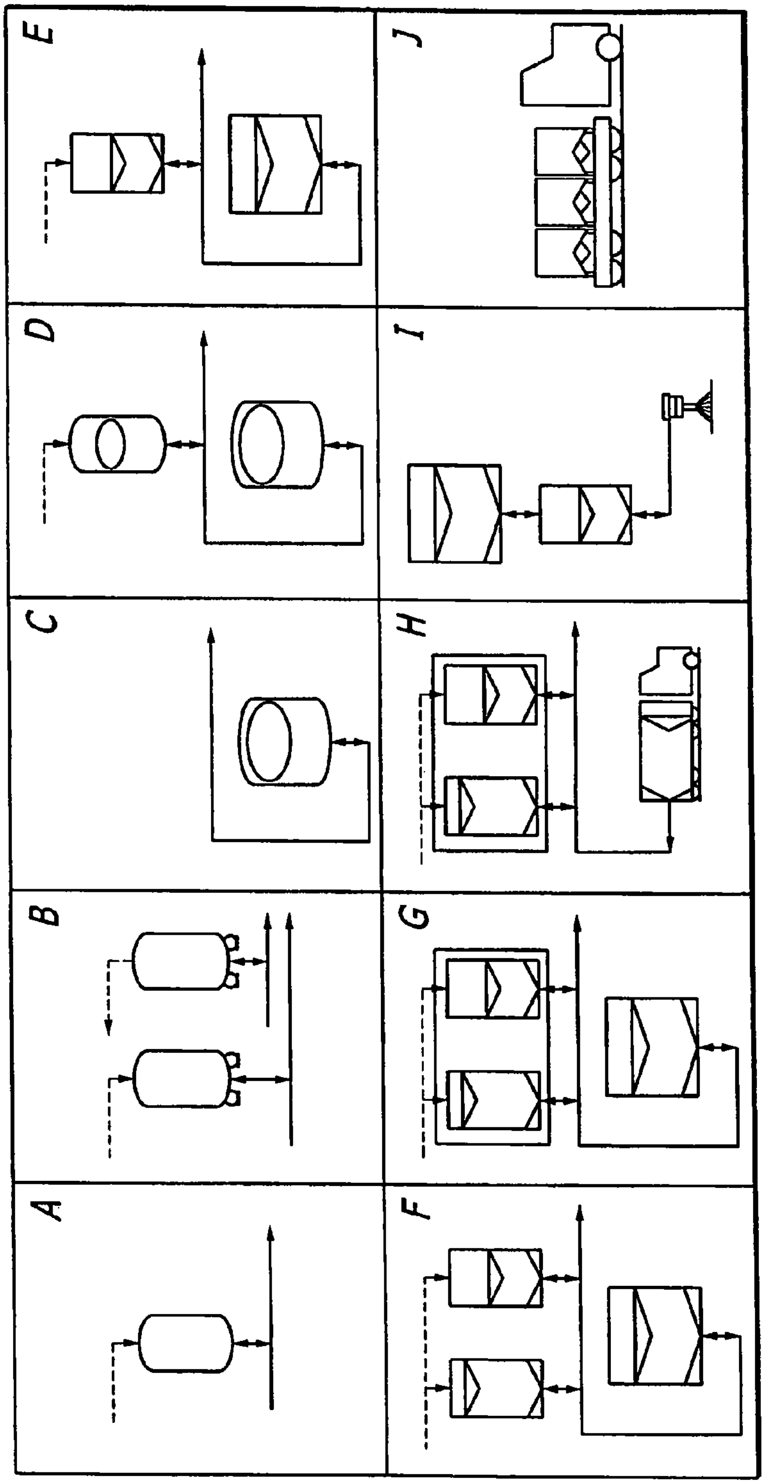
FIG. 17 is a block diagram representation of several configurations of material transfer systems in accordance with the present invention.

When at least one material transfer subsystem 110 is included in the material transfer section 1020 of the automated material transfer station 1000, the material vessels 120 may be configured such that one system is filling as another system is emptying (FIGS. 12, 13B, 16). The vessels may be the same size or of different sizes (FIG. 17). In addition, compound material transfer subsystems may be configured such that two or more vessels of different sizes may be connected in series to obtain efficiencies as a first larger vessel (having a force transfer device of a first aspect ratio) feeds one or more second smaller vessels that may have force transfer devices with different aspect ratios than the larger vessel. The material transfer subsystems may feed pumps and/or directly feed material to a device such as a robotic sprayer (applicator) or "shot meter." Likewise, multiple vessels may be in fluid communication with one or more material (fluid) manifolds that are connected to one or more pumps and applicators. As shown in FIG. 17, the automated material transfer system may be externally fed by larger material transfer systems, such as those on the back of a railcar or truck. Further, the vessels may be positioned side by side or stacked on top of each other for efficiency of storage within the compartment 1050 of the material transfer section 1020 of the automated material transfer station 1000. Large storage tanks of fluid and other materials may be configured to feed several such automated control stations.

The vessel (container) 20, 120, force transfer device 90, and/or other items in contact with the material may be equipped with a lining (not shown). The materials of construction suitable for the lining may include, but are not limited to, alloys, composites, elastomers, metals, plastics, polymers, rubbers, wood fiber and other natural and synthetic materials. The forms of the lining may include, but are not limited to, attached (form-fitted) and independent (stand-alone); flexible and rigid; and applied and pre-formed. The functions of the lining may include:

(1) Protecting the underlying items from corrosion and/or erosion (a "liner");

(2) Providing a designated "wearing" component that may be replaced, based on cleaning and/or wear;

(3) Providing a surface in contact with the material that is smoother than the underlying surface;

(4) Providing a component impregnated with a release agent to improve material transfer and/or cleaning;

(5) Providing a component impregnated with an antimicrobial material to decrease microbial growth; and (6) Providing a designated component for electrical and/or thermal conductance and/or resistance (resistance heating and/or heat insulation).

FIG. 17 provides a summary of the evolution of refillable material transfer technologies over about a twelve year span. Within that period changes were made in the following areas:

Fluids
Container size
Container mobility
Container internals
System sophistication
System configuration
System functionalities
System automation and intelligence For the ten stages (A to J) represented in FIG. 17, the following is a brief representation of the past and anticipated changes.

Referring to FIG. 17A:

Fluids: liquids such as fuels (diesel, gasoline), oils (lubricating, vegetable)

Container size: small (25 gallon)

Container mobility: fixed and non-portable

Container internals: non-existent

System sophistication: primitive

System configuration: single container for each fluid

System functionalities: storage and transfer fluid to a container or vehicle

System automation and intelligence: none

Referring to FIG. 17B:

Fluids: new and recyclable liquids such as new and used lubricating oils

Container size: small (25 gallon)

Container mobility: portable

Container internals: non-existent

System sophistication: more sophisticated

System configuration: dual containers one for new fluid one for used fluid

System functionalities: storage, transfer fluid to and from vehicles

System automation and intelligence: none

Referring to FIG. 17C:

Fluids: semi-solids such as lubricating greases

Container size: bulk size (600 gallon)

Container mobility: transportable

Container internals: fairly sophisticated follower device

System sophistication: more sophisticated

System configuration: single large containers transported to user's site

System functionalities: storage and normally transfer to a grease pump

System automation and intelligence: none

Referring to FIG. 17D:

Fluids: semi-solids such as lubricating greases

Container sizes: bulk size (600 gallon) and multiple small (25 gallon)

Container mobility: transportable bulk and stationary or portable small

Container internals: fairly sophisticated follower device

System sophistication: still more sophisticated

System configuration: large containers transported to and from the user's site to oil refiners and multiple small containers at the user's site System functionalities: bulk storage and transfer to small containers; small container storage and transfer to grease pumps System automation and intelligence: none Referring to FIG. 17E:

Fluids: semi-solids such as Adhesive Sealants and Mastics (ASM) and/or liquids

Container sizes: intermediate bulk size (300 gallon)

Container mobility: transportable intermediate bulk

Container internals: more sophisticated follower device for semi-solids

System sophistication: still more sophisticated

System configuration: large containers transported to and from the user's site to fluid providers System functionalities: bulk storage and transfer to ASM pump System automation and intelligence: none Referring to FIG. 17F:

Fluids: semi-solids such as Adhesive Sealants and Mastics (ASM) and/or liquids

Container sizes: intermediate bulk size (300 gallon) and two small (25 gallon)

Container mobility: transportable intermediate bulk and stationary small

Container internals: more sophisticated follower device

System sophistication: still more sophisticated

System configuration: large containers transported to and from the user's site to fluid providers and multiple two containers at the user's site System functionalities: intermediate bulk storage and transfer to small containers;

Small container storage and transfer to ASM pumps

System automation and intelligence: some automation and nominal intelligence

Referring to FIG. 17G:

Fluids: semi-solids such as Adhesive Sealants and Mastics (ASM) and/or liquids

Container sizes: intermediate bulk size (300 gallon) and two small (25 gallon)

Container mobility: transportable intermediate bulk and stationary small

Container internals: more sophisticated follower device

System sophistication: still more sophisticated

System configuration: large containers transported to and from the user's site to fluid providers and multiple two containers at the user's site. Small containers in environmentally controlled cabinet System functionalities: intermediate bulk storage and transfer to small containers;

Small container storage and transfer to ASM pumps

System automation and intelligence: some automation and nominal intelligence

Referring to FIG. 17H:

Fluids: semi-solids such as Adhesive Sealants and Mastics (ASM) and/or liquids

Container sizes: transportable bulk (600 gallon) bulk and intermediate bulk size (300 gallon)

Container mobility: transportable bulk and stationary, cleanable intermediate bulk Container internals: still more sophisticated follower device System sophistication: still more sophisticated System configuration: transportable bulk is trailer to tractor to and from the user's site to fluid providers and multiple intermediate bulk containers at the user's site, in environmentally controlled cabinet System functionalities: bulk storage and transfer to intermediate bulk containers;

Intermediate bulk containers storage and transfer to ASM pumps

System automation and intelligence: significant automation and increased intelligence Referring to FIG. 17I:

Fluids: semi-solids such as Adhesive Sealants and Mastics (ASM) and/or liquids

Container sizes: transportable bulk (600 gallon) bulk and intermediate bulk size (300 gallon)

Container mobility: transportable bulk and stationary, cleanable intermediate bulk Container internals: still more sophisticated follower device System sophistication: pumpless, simple and smart System configuration: transportable bulk is trailer to tractor to and from the user's site to fluid providers and multiple intermediate bulk containers at the user's site, in environmentally controlled cabinet System functionalities: bulk storage and transfer to intermediate bulk containers; intermediate bulk containers storage and configured to transfer ASM directly to the point of applications System automation and intelligence: more significant automation and increased Intelligence Referring to FIG. 17J: Multiple refillable material transfer systems may be configured on a cargo truck and cargo trailer. The configuration of these multiple systems may be independent configurations (for example, independent systems, and independent instrumentation and controls), combined configurations (for example, integrated systems, and integrated systems and controls), and various hybrid configurations (for example, independent systems, and integrated instrumentation and controls). In one anticipated embodiment of a hybrid configuration for bulk transport of a single material (for example, automotive LASD (Liquid Applied Sound Deadener)), twenty refillable material transfer systems, each system four feet length by four feet width, would be on a cargo trailer that is forty feet length by eight feet width. In this configuration, the compressed gas piping would be manifolded together (integrated), the material piping would be manifolded together (integrated), and the instrumentation and controls would be integrated. However, in this configuration, each of these twenty refillable material transfer systems would be operated independently (hybrid). A common material inventory control methodology, FIFO (First In First Out), may be accomplished by independently and sequentially filling and emptying the refillable material transfer systems. In another anticipated embodiment of a hybrid configuration for semi-bulk transport of multiple materials (for example, automotive epoxy resin, automotive epoxy hardener, automotive sealant, and automotive structural adhesive), four refillable material transfer systems, each system four feet length by four feet width, would be on a cargo truck, with a bed sixteen feet length by eight feet width. In this configuration, the compressed gas piping would be manifolded together (integrated), and the instrumentation and controls would be integrated. However, in this configuration, the material piping would be separate. A common material delivery methodology, "milk runs", may be accomplished by independently filling and emptying the refillable material transfer systems.

As further shown in the drawings for purposes of illustration, the present invention also is directed to a pumpless material dispensing system for dispensing various materials, including, but not limited to, LASD, oils, greases, mastics, sealants, elastomers and other types of fluids. The system includes an automated material transfer system utilizing a material containment vessel having an upper region incorporating a motive force, and a bottom region with a material ingress and egress opening. A diconical or other shaped, level-instrumented force transfer device may be located in the material containment area. The present invention further includes incorporating a data acquisition system into known and yet to be developed refillable material transfer system technology. The automated material transfer system is further configured to interface with a metering device system and/or a robotic material dispenser system.

The high levels of automation and communication of the present invention were previously unavailable with commercial refillable material transfer system technology. The control system and its components are preferably small and light, including miniature electronic components, relative to the refillable material transfer system, to be portable. The control system components preferably have a low cost and low energy consumption, including miniature electronic components, to be practical. Currently available devices may perform the various functions of the control system. The high levels of automation and communication for the control system of the present invention convert the refillable material vessel into a fully automated portable system.

Figure 18:
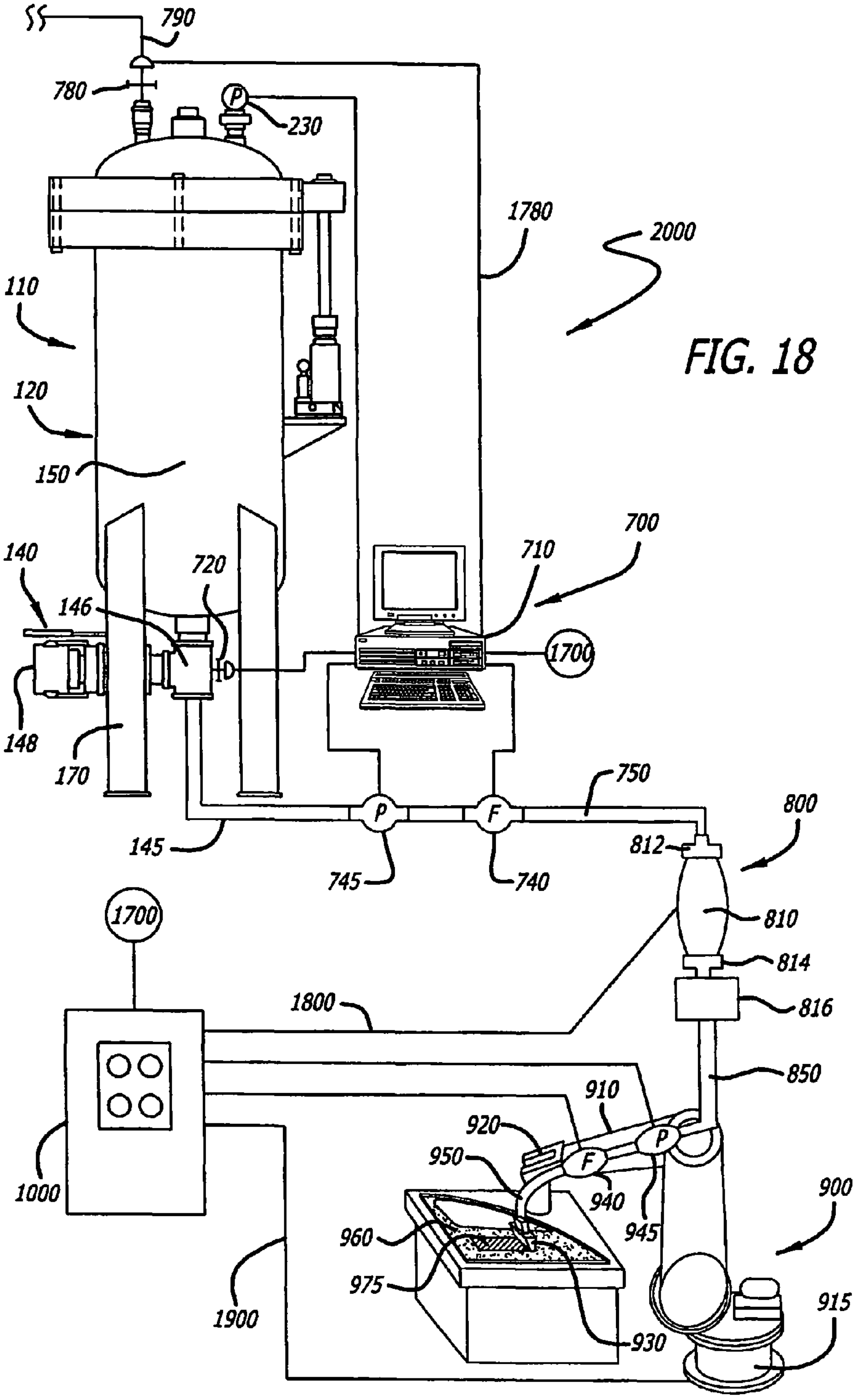
FIG. 18 is a schematic representation of a pumpless material dispensing system in accordance with the present invention.
Figure 19A:
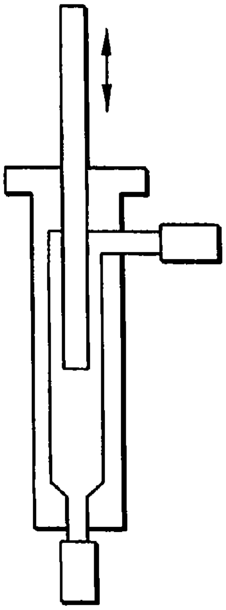
FIGS. 19A through 19H are prior art metering devices suitable for use with the pumpless material dispensing system of FIG. 18.
Figure 19B:
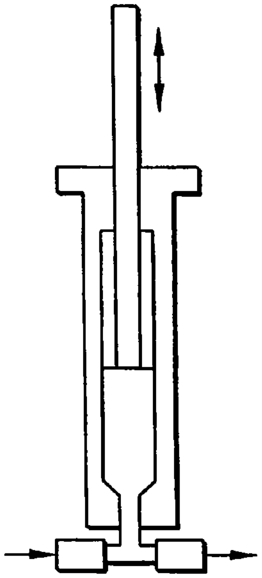
Figure 19C:
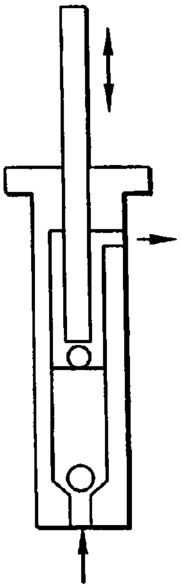
Figure 19D:
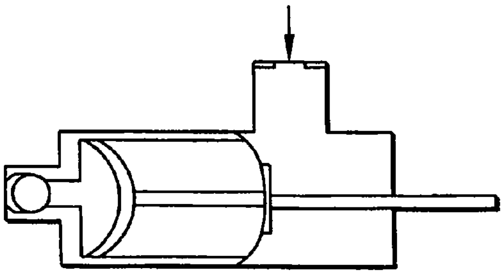
Figure 19E:
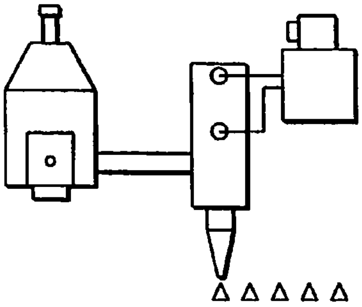
Figure 19F:
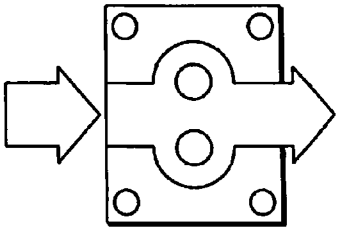
Figure 19G:
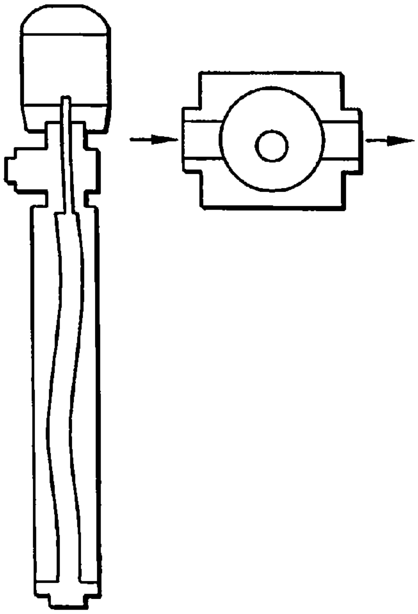
Figure 19H:
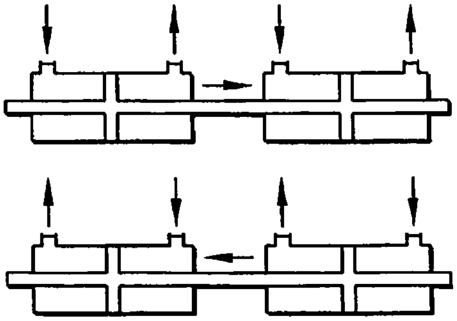

Referring now to FIG. 18, the pumpless material dispensing system 2000 of the present invention includes an automated material transfer system 110, a metering device system 800 and a robotic material dispenser system 900. The automated material transfer system 110 is configured with a control system 700 having a PLC, PRC, computer controller or other computer processing system 710. Inputs to the process control system 710 may include, but are not limited to, any instrumentation shown in FIGS. 18 and 19. The automated material control system may be further configured with a fluid control valve 720 associated with the fluid inlet and outlet manifold 140. The computer controller 710 may be associated with the base and pedestal 170 of the vessel 120, or may be located remotely and operably connected to the instrumentation and control devices. The automated material transfer system may be configured for providing oils, greases, mastics, sealants, elastomers and other materials such as liquid sound deadeners. Such materials may include, but are not limited to, thick fluids, viscous fluids, semi-solid fluids, visco-elastic products, pastes, gels and other fluid materials that are not easy to dispense. The computer control system 710 may be configured to interface with the metering device system 800 and the robotic material dispenser system 900 the of the present invention.

The automated material transfer system 110 may be configured with a pressure sensor 230 that may be connected as an input to the process controller 710. The process controller may include an output control signal 1780 for regulating a flow control valve 780 interposed between the material vessel 120 and a pressurized gas (or other fluid) input conduit (pipe, line) 790. The automated material transfer system further includes an inlet conduit (pipe, line) 148 and an outlet conduit (pipe, line) 146. The outlet manifold 140 is in fluid communication with a material transfer conduit (pipe, line) 145 having instrumentation, such as a flow sensor 740 and a pressure sensor 745, operably connected to the process controller, which regulates the material outlet control valve 720. The material transfer conduit 145 is in fluid communication with a material transfer manifold (conduit, pipe, line) 750 that is in fluid communication with the metering device system 800.

The metering device system 800 includes a metering device 810, for example, a shotmeter, a mastic regulator, or other suitable other flow element, such as a differential pressure device (orifice, venturi), a displacement device (gear, piston), a magnetic device ("mag meter"), an ultrasonic device (Doppler), a mass based device (Coriolis, MICRO MOTION), or a device configured for solids (progressive cavity, screw). Additional examples of metering devices suitable for use with the pumpless material dispensing system 2000 of the present invention are shown in FIGS. 19A-19H. The function of the metering device is to provide material 75 (FIG. 20) to the robotic material dispenser system 900 through a material transfer conduit (pipe, line) 850. The metering device system may further include an input manifold 812, an output manifold 814 and a material plunger 816 that are in fluid communication with the material transfer conduits and manifolds 145, 750, 850 leading from the automated material transfer system 110 to the robotic material dispenser system 900.

Figure 20A:
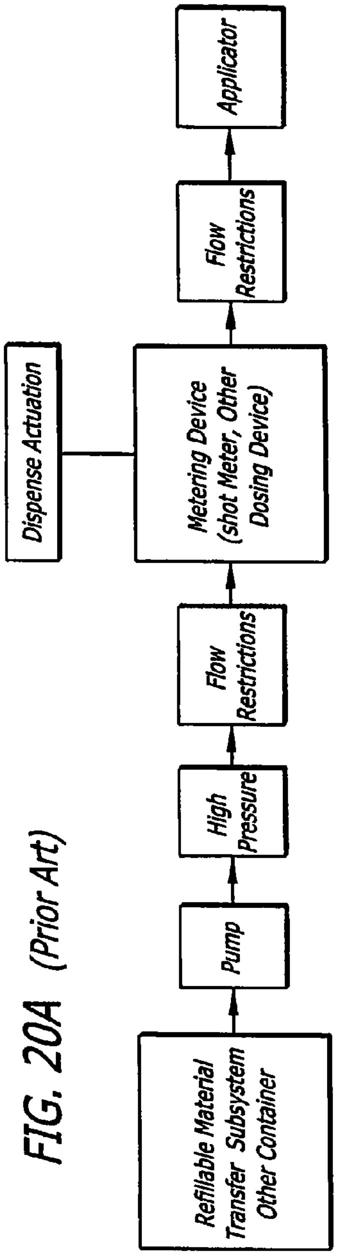
FIG. 20A (Prior Art)
FIGS. 20A and 20B are block diagrams of a prior art material dispensing system and a pumpless material dispensing system of the present invention.
Figure 20B:
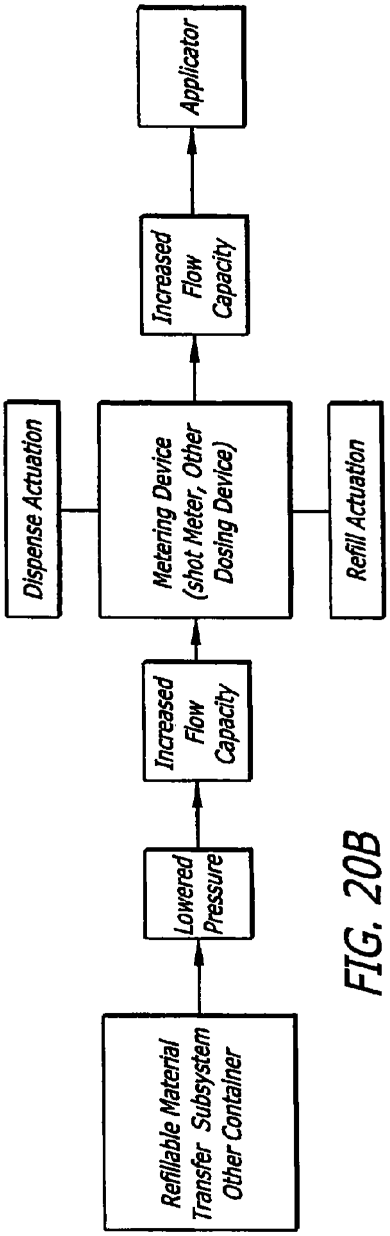

Referring now to FIGS. 20A and 20B, prior art dispensing systems for thick, viscous fluids and other such materials include a container or refillable material transfer subsystem, a pump, a metering device and an applicator. Such prior art systems may have metering devices with significant flow restrictions in their inlet and/or outlet, and may be configured with actuation for their dispense stroke only. Such systems require significant energy from pumps to transfer material through the metering device inlet and/or outlet restrictions to actuate the metering devices during their refill cycles. As shown in FIG. 20B, the pumpless material dispensing system of the present invention substantially eliminates the flow restrictions in the inlet and outlet of the metering device, and may add actuation for the refill stroke of the metering device. The system of the present invention decreases the energy required to transfer material through the metering device to the applicator. The metering device may be further configured with improvements, including inlet and outlet components having increased flow capacity and components for actuation in the refill stroke. The material dispensing system of the present invention does not require a pump, is simpler, has fewer components and requires less space than prior art dispensing systems. The system of the present invention includes lower-cost lower-pressure components upstream of the metering device, and costs less to purchase, install, operate and maintain.

Referring again to FIG. 18, the robotic material dispenser system 900 includes a robot arm 910, an applicator mount 920 disposed at a distal end of the robot arm and a material applicator (dispenser) 930 fixed to the mount. The robot arm extends up from a base 915, and is movable through a number of axes, allowing it to move to the desired position with respect to a part or piece (for example, an automobile door) 960 being coated or treated and to obtain the proper orientation with respect thereto. In the embodiment shown in the FIG. 18, the material applicator 930 is a broad slit nozzle. As those skilled in the art will appreciate, any type of dispensing outlet may be used, depending on the application parameters and the desired configuration of material 75, 975 being applied, for example, spray guns, pin-hole applicators and nozzles, contact and non-contact, air-atomizing and airless, such as cone, flat (fan, slit, slot), and stream (needle, swirl).

A robot controller 1000 controls the position, orientation and speed of movement of the robot arm 910 and all of its elements by one ore more control signals 1900 to the robotic material dispenser system 900. The elements of the robot move with respect to each other and the base end 915 of the robot. The robot controller controls the position and speed of the robot and material applicator 930. In accordance with the present invention, the robot controller also receives input signals and generates output signals to operate the metering device system 800. A material transfer conduit (pipe, line) 950 that is in fluid communication with the material transfer conduit 850 from the metering device system 800 and that is connected to material applicator may include instrumentation, such as a flow sensor 940 and a pressure sensor 945, operably connected to the robot controller.

Figure 21:
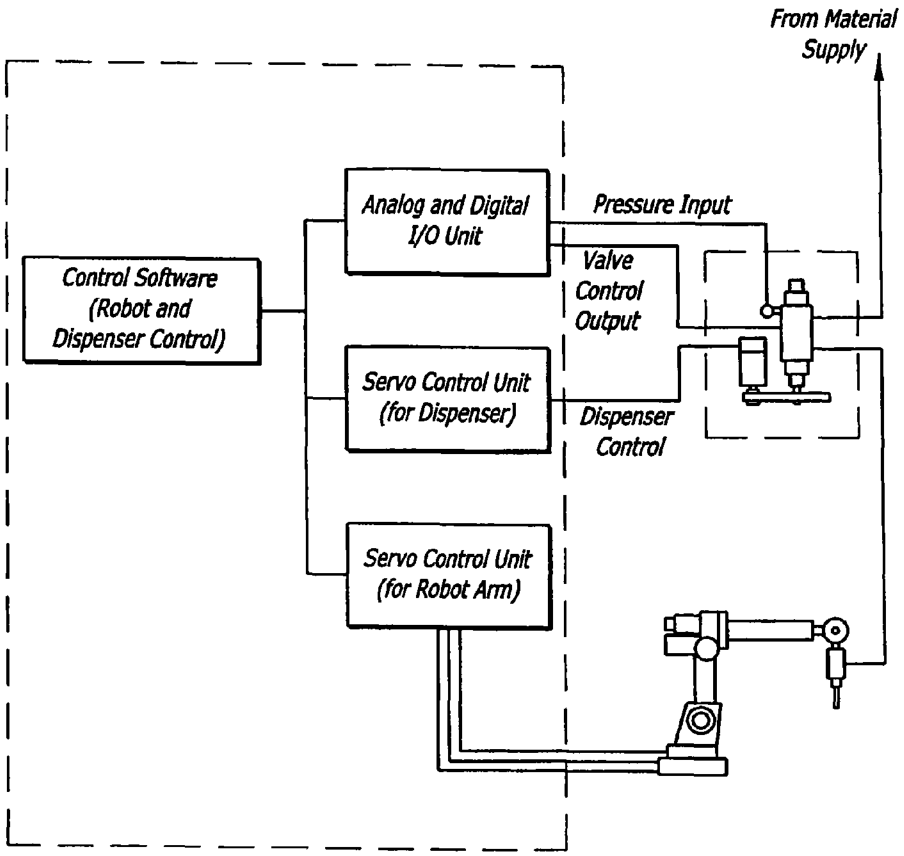
FIG. 21 is a prior art integral servo dispensing system suitable for use with the pumpless material dispensing system of FIG. 18.

More specifically, the robot controller 1000 controls the volume of the material 975 being applied to the part 960 by the material dispenser 930. The robot controller may monitor and control the operation of the metering device through a control signal 1800 to the metering device system 800, for example, controlling the position of a piston in a shotmeter. The robot controller may be configured to control the charging and discharging of the material 975 by controlling air valves, pressure regulators, inlet valves and outlet valves (not shown). The robot controller is also linked 1700 to the computer processing system 710 of the control system 700 and the various instrumentation of the automated material transfer system 110 so as to allow feedback and feed forward control of the pressure in the material vessel 120 and the flow and pressure of the material in the conduits 145, 750, 850 and 950 of the pumpless material dispensing system. An alternative embodiment of a metering device system 800 and a robotic material dispenser system 900 having a double acting shotmeter unit and robotic servo control unit is shown in FIG. 21.

Figure 22A:
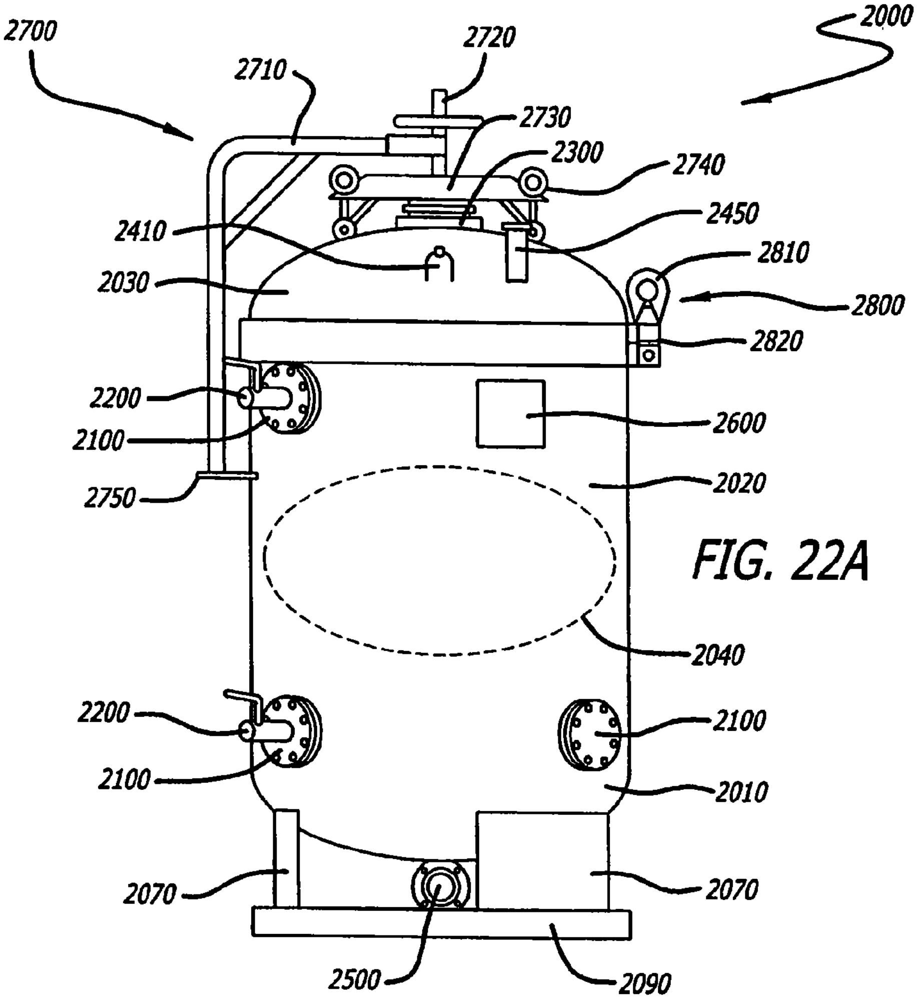
FIGS. 22A-22D are side, top, bottom and partial lower side plan views of an alternative embodiment of a refillable material vessel having a removable lid for use with an integrated material transfer system of the present invention.
Figure 22B:
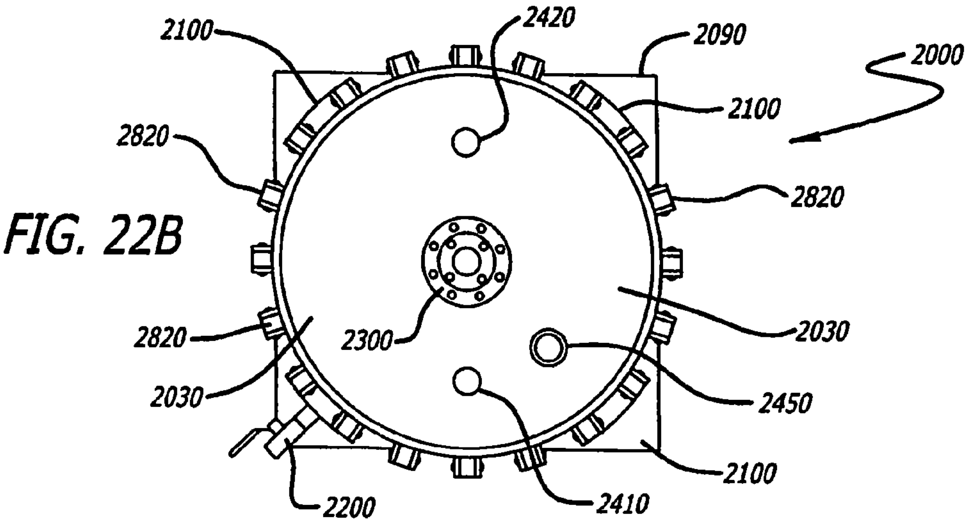

As shown in FIGS. 22A-22D, the integrated material transfer system of the present invention may include a refillable material vessel 2000 configured in a vertical format; however, horizontal and other configurations may be used. Referring to FIG. 22A, the material vessel includes a main body 2020, a top portion 2030 and a bottom portion 2010, which may include a plurality of legs 2070 or extensions and a base 2090. The base may be configured for sliding in and out of the automated material transfer station 1000 (FIG. 16).

Figure 22C:
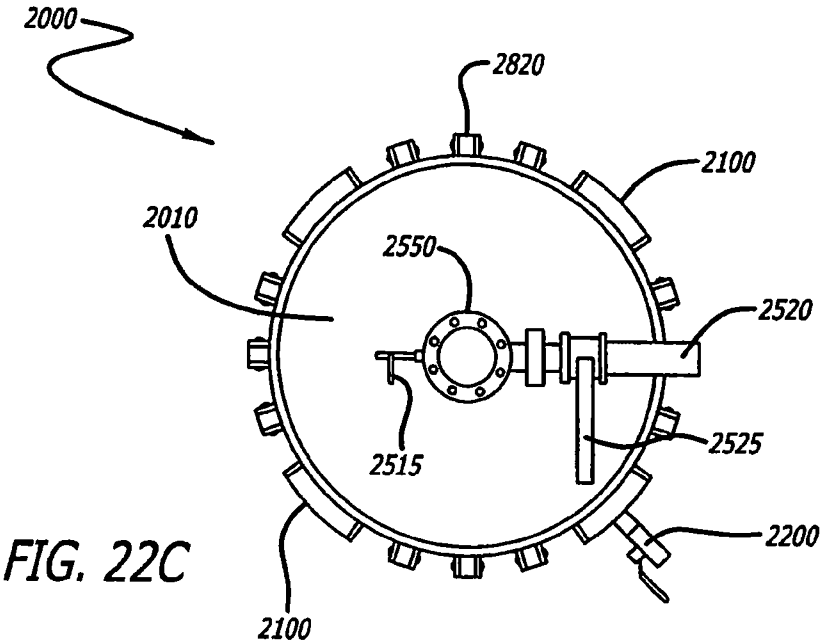
Figure 22D:
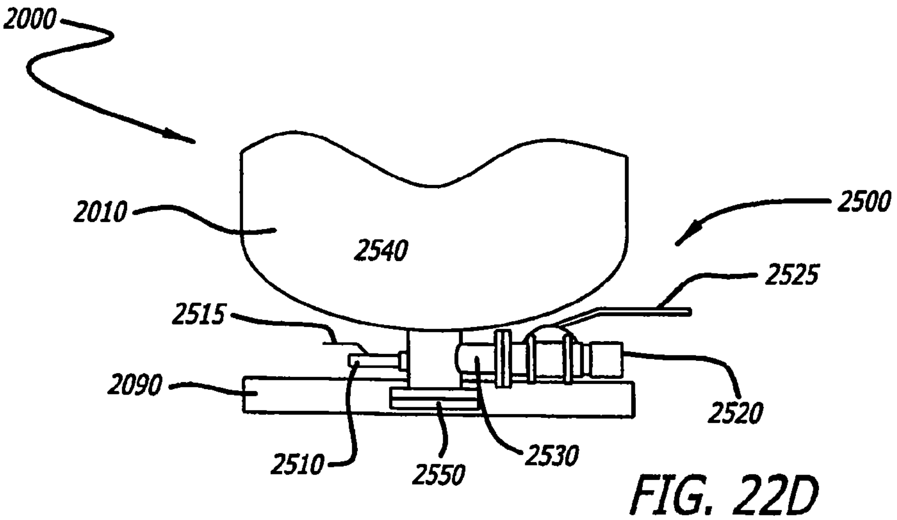

As shown in FIG. 22A, the main body of the material vessel 2000 may be configured in a cylindrical format, wherein the top of the refillable container is configured as a two piece portion connected by a series of removable flanges or screw-type mechanisms, such as eye nuts on the ends of rods. The refillable material vessel may be further configured with a material inlet and outlet manifold positioned below the main body 2020 of the vessel and adjacent the bottom portion 2010 of the vessel, as shown in FIGS. 22C and 22D and as heretofore described regarding FIGS. 1 through 24. Likewise, the refillable material vessel may be further configured with controls and other mechanisms as heretofore described regarding FIGS. 1 through 24. The vessel may be configured with a lifting mechanism 2700.

Referring to FIG. 22A, the refillable material vessel 2000 may be further configured with one or more clean-out ports 2100 configured on the lower portion 2010 of the body 2020 of the material vessel. The clean-out port may be configured as any suitable mechanism as is known to those of ordinary skill in the art, such as a four-inch flanged two piece circular-shaped device that is secured to the vessel body. The clean-out port may include a first inner portion (piece) bolted to the vessel body and a second outer portion (piece) removably bolted or otherwise secured to the first portion of the clean-out port. The clean-out port may further be configured with a sample valve 2200.

A separate sample valve 2200 may also be configured on the lower portion 2010 and/or upper portion 2030 of the body 2020 of the material vessel 2000. The sample valve may be configured as any suitable mechanism as is known to those of ordinary skill in the art, such as a two piece flange, wherein the first inner portion (piece) is secured to the body of the vessel and a second inner portion (piece) may be removably secured to the first piece via bolts, nuts or other suitable mechanism. The sample valve may include a spigot (port) 2250 having a handle and outlet (opening) for allowing the user to remove a quantity of material from the vessel. The spigot outlet may be further threaded or otherwise configured for connecting to a hose or other conduit.

The upper portion 2030 of the vessel 2000 may be configured with one or more site windows (viewing ports) 2300 for observing material and the internal components within the vessel. For example, a first sight window may be used for providing a light source into the vessel so that the internals of the vessel may be viewed through a second window. Similarly, a camera or other mechanism may be used to record changes in the material within the vessel through one of the view ports and may contain its own light source. Alternatively, the viewing ports may be configured with a fixed or removable, still or video camera system for observing and recording the material and internal components of the vessel.

The upper portion 2030 of the refillable material vessel 2000 may further include a valve or other entry port 2400 for spraying or otherwise introducing a biocide or other agent into the material vessel before or after it is filled with its primary material, such as LASD. The biocide valve may be configured as any suitable mechanism as is known to those of ordinary skill in the art. The top portion of the vessel may further include one or more valves or ports 2500 for introducing and releasing pressurizing air or inert gas, as may be required for the fluid or material to be transferred into and out of the vessel. The gas valve may include quick disconnects for compressed air, nitrogen or other pressurized gas source.

As further shown in FIG. 22A, the refillable material vessel 2000 may include an force transfer device (internal follower device, boat) 2040 as heretofore described regarding FIGS. 1 through 9. The internal walls of the vessel may be configured from welded steel (ASME vessel), and may be further coated with a protective material, such as an epoxy paint, an oil, a rust inhibitor or a relatively inert material.

The refillable material vessel 2000 may be configured with specific features for application wherein the material to be transferred into and out of the vessel is a liquid applied sound deadener (LASD). Such features include a closed fluid containment formed from a basic material of construction of mild steel rated for at least seventy-five (75) psig, quick disconnect valves for entry and exit of the LASD, and quick disconnect valves for compressed air or other gas. The refillable material vessel may also include a service valve with an air chuck, a forklift base near the bottom portion 2010 of the vessel, mechanical protections and internal surface coatings. The vessel may include an internal follower device (boat) having an annulus device that is variable in diameter, or may be configured such that the follower device is adaptable for various annulus devices to create different spaces or gaps between the follower device and the internal walls of the vessel. The vessel may be further configured with an access port (not shown) for changing the annulus on the follower device (boat).

As shown in FIG. 22A, the refillable material vessel 2000 of the present invention may further include a data logger 2600 that may be configured with various features as heretofore described regarding FIGS. 1 through 24. Additional aspects for the data logger may include a microbe detector (for example, a $CO_2$ detector), a particulate detector and/or an odor detector, wherein the detectors may include a monitoring device with audible and/or visual alarms. The vessel may be associated with a wireless device for transfer of information from the data logger via a cell phone, or other such radio frequency, microwave, infrared or laser device. The data logger and/or vessel may interface with a systems locator, such as a GPS device. The data logger and/or vessel may further include a radio frequency identification (RFID) system. The data logger may further interface with sensors, monitors and controls for temperature, pressure, humidity and pH detection and data storage. The data logger system may further include and interface with sensors, monitors and controls for material level and flow, which may be connected to internal limit switches. Various alarms may be further configured to interface with the data logger and such sensors, monitors and controls.

The refillable material vessel 2000 of the present invention may further be configured so that one vessel is stackable upon another vessel. An LED or other light source may be configured under the top portion 2030 of the vessel for illuminating the internal portion of the vessel for viewing through a site window 2300. Other suitable materials of construction for the vessel include stainless steel, plastic, composites and aluminum. The follower plate may further be configured for adapting to a wiper system for cleaning the inside walls of the vessel.

The refillable material vessel 2000 may be further configured with valves, conduits and pipes as shown in FIGS. 1 through 21 so as directly feed a shotmeter, robot or other material applicator device. The refillable material vessel of the integrated material transfer system of the present invention may be configured for stationary or removable placement within a cabinet system as shown in FIGS. 1 through 21.

Figure 23C:
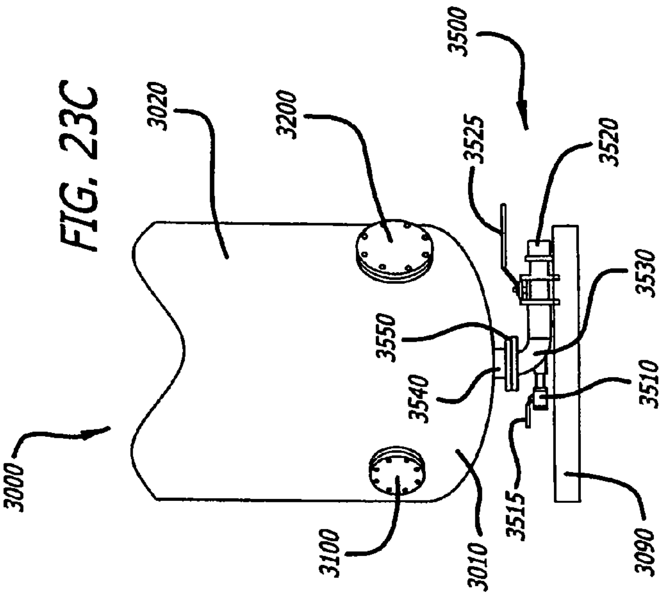
FIGS. 23A-23C are side, top and partial lower side plan views of an alternative embodiment of a refillable material vessel having a fixed lid for use with an integrated material transfer system of the present invention.
Figure 23B:
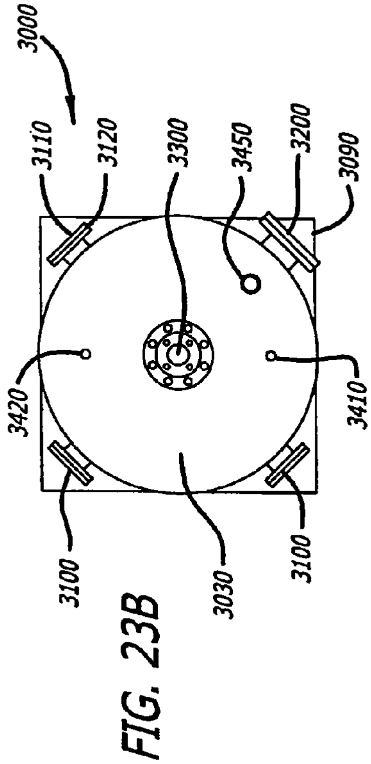
Figure 23A:
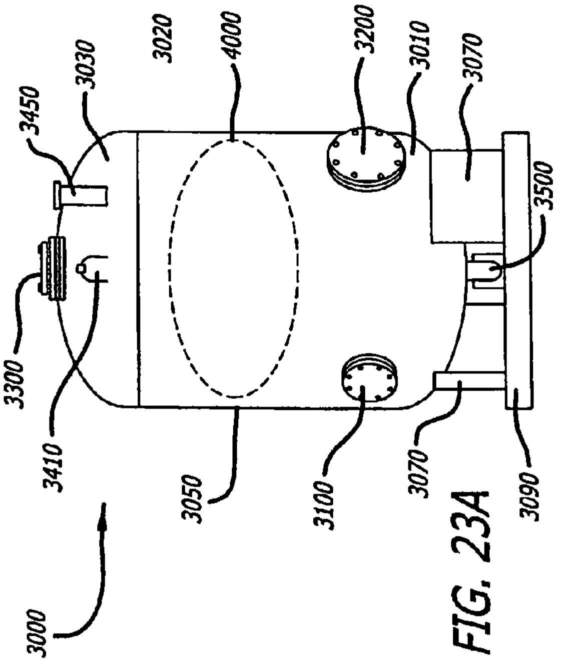

As shown in FIGS. 23A, 23B, 23C and 24A, 24B, 24C, the integrated material transfer system of the present invention may include a refillable material vessel 3000 configured in a vertical format; however, horizontal and other configurations may be used. Referring to FIG. 23A, the material vessel includes a main body 3020, a top portion 3030 and a bottom portion 3010, which may include a plurality of legs or extensions 3070 and a base 3090. The base may be configured for sliding in and out of the automated material transfer station 1000 (FIG. 16). The vessel may be configured from carbon steel and other suitable materials of construction for the vessel include stainless steel, plastic, composites and aluminum. The vessel internal walls may be coated with a protective material, such as an epoxy paint, an oil, a rust inhibitor or a relatively inert material.

As shown in FIG. 23A, the main body 3020 of the refillable material vessel 3000 of the present invention may be configured in a cylindrical format, wherein the top of the refillable container is configured as a two piece portion wherein the top portion 3030 is welded or otherwise secured to the main body. The material vessel may further be configured so that one vessel is stackable upon another vessel. The refillable material vessel may be further configured with a material inlet and outlet manifold 3500 positioned below the main body of the vessel and adjacent the bottom portion 3010 of the vessel, as shown in FIG. 23C and as heretofore described regarding FIGS. 1 through 9. Likewise, the refillable material vessel may be further configured with controls and other mechanisms as heretofore described regarding FIGS. 1 through 18.

Referring to FIGS. 23A-23C, the refillable material vessel 3000 may be further configured with one or more clean-out or access ports 3100 configured on the body 3020 of the material vessel. Each clean-out port may be configured as any suitable mechanism or device as is known to those of ordinary skill in the art, such as a four-inch, two piece circular-shaped flange that is secured to the vessel body. As shown in FIG. 23B, a clean-out port may include a first inner portion (piece) 3120 bolted or otherwise secured to the vessel body and a second outer portion (piece) 3110 removably bolted or otherwise secured to the first portion of the clean-out port. One or more of the clean-out ports may further be configured with a sample valve (FIG. 22A). The access ports are configured so that the vessel may be cleaned without having to remove or otherwise disassemble the upper portion 3030 from the body of the vessel. High pressure fluid hoses may be used through the access ports to wash the inside of the vessel and the force transfer device 4000. During the wash procedure, cleaning fluid may exit through the manifold 3500 via the access pipe 3540 (FIG. 23C). The clean-out ports may be position near the bottom portion 3010 of the vessel and may also be positioned at higher vertical locations on the vessel for access to the inside of the upper portion 3030 of the vessel.

The upper portion 3030 of the vessel 3000 may be configured with one or more site windows (viewing ports) 3300 for observing material and the internal components within the vessel. For example, a first sight window may be used for providing a light source into the vessel so that the internals of the vessel may be viewed through a second glass or polycarbonate window. Alternatively, a light source may be introduced through another port 3500 configured in the upper portion of the vessel. An LED or other light source may be configured under the top portion of the vessel for illuminating the internal portion of the vessel. A camera or other mechanism may be used to record changes in the material within the vessel through one of the view ports, and may contain its own light source. Alternatively, the viewing ports may be configured with a fixed or removable, still or video camera system for observing and recording the material and internal components of the vessel.

The 3300 sight window may also have the following functions:

- Access for visual inspection of the amount of material in the vessel (for example, empty or full).
- Access for visual inspection of the physical characteristics of the gas and material in the vessel (for example, color, defects, foreign material, indication of material mixing (for example, striations on the material surface from the follower device), opaque/reflective, presence of material surface treatments (for example, biocide), texture, uniformity).
- Access for visual inspection of instrumentation for the physical characteristics of the gas and material in the vessel (for example, litmus paper; temperature cards; humidity cards; microbial detection cards; gas detection cards; available from Cold Chain Technologies, Holliston, Mass., Drager/Draeger (worldwide), Telatemp, Fullerton, Calif.; and Uline, Lake Forest, Calif.)
- Access for optical instrumentation, for example, position of the follower device (laser, RF (Radio Frequency)), visual inspection of the physical characteristics of the gas and material in the vessel (still pictures, moving pictures, computer-based visual comparators (vision systems)).
- Access for visual inspection of the physical characteristics of the vessel (for example, clean/dirty, evidence of wear).
- Access for treating the surface of the material (for example with IR (infrared) light for temperature treatment, and UV (Ultraviolet) light for microbial treatment).

In addition, the 3300 sight window may be hinged, or the following additional functions otherwise provided for, for:

- Access for sampling material from the vessel (for example “thief hatch”).
- Access for rigging the follower device inside the vessel (for example, during cleaning, or during replacing the Replaceable Annular Management Device).
- Access for cleaning the vessel (for example, pressure washing).
- Access for replacing replaceable gas and/or material and gas instrumentation (for example, litmus paper, temperature cards, humidity cards, microbial detection cards, gas detection cards).
- Access for treating the surface of the material (for example with biocide, diluent) or the vessel (for example, with biocide, release agent).

The upper portion 3030 of the refillable material vessel 3000 may further include a valve or other entry port 3500 for spraying or otherwise introducing a biocide or other agent into the material vessel before or after it is filled with its primary material, such as LASD. The biocide valve may be configured as any suitable mechanism as is known to those of ordinary skill in the art. The top portion of the vessel may further include one or more valves or ports 3410, 3420 for introducing and releasing pressurizing air or inert gas, as may be required for the fluid or material to be transferred into and out of the vessel. The gas valve may include quick disconnects for compressed air, nitrogen or other pressurized gas source.

As shown in FIG. 23C, a fluid manifold 3500 may be positioned below the bottom portion 3010 of the main body 3020 of the refillable material vessel 3000. The manifold includes a material sample valve 3510 having a valve and handle 3515. The fluid manifold further includes a material inlet/exit fitting 3520 and a valve and handle 3525. The inlet and outlet connections are in fluid communication with a common pipe or conduit 3530 that may be connected to the vessel via a flange 3550 that couples to an outlet conduit 3540 configured within the bottom portion of the vessel. The refillable material vessel may be further configured with valves, conduits and pipes as shown in FIGS. 1 through 21 so as directly feed a pump, shotmeter, robot or other material applicator device. The refillable material vessel of the integrated material transfer system of the present invention may be configured for stationary or removable placement within a cabinet system as shown in FIGS. 12 through 16.

Figure 24C:
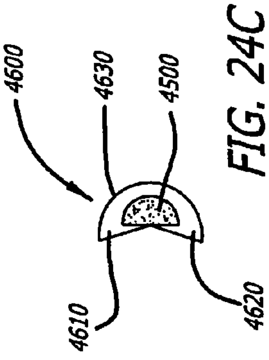
FIGS. 24A-24C are side, top and partial end plan views of an alternative embodiment of a force transfer device having a replaceable annular management device for use in a refillable material vessel of the present invention.
Figure 24B:
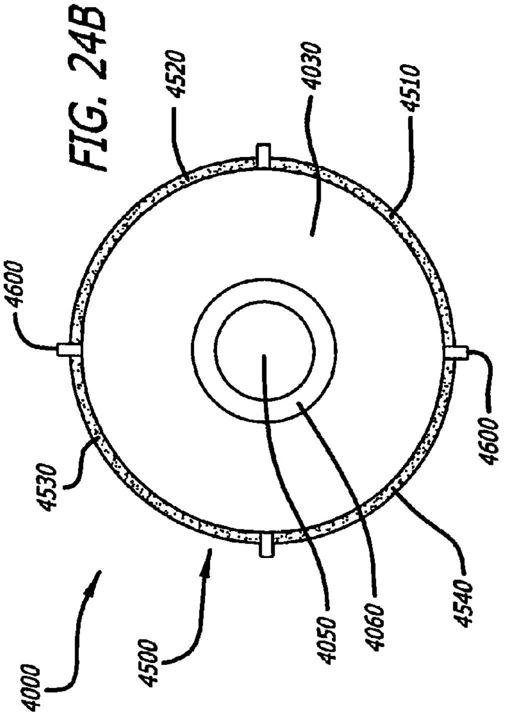
Figure 24A:
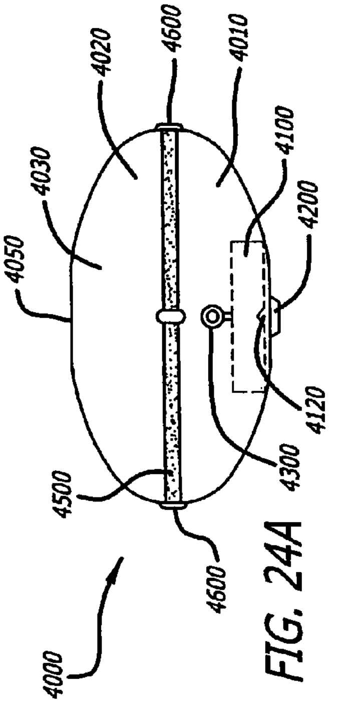

As further shown in FIGS. 23A and 24A-24C, the refillable material vessel 3000 may include a "force transfer device" (internal follower device or boat) 4000 as heretofore described regarding FIGS. 1 through 9. Referring now to FIG. 24A, the force transfer device may be configured with an oval shape in cross-section (egg-shaped in three dimensions) or other suitable shape (see FIGS. 8, 9 and 14A) for residing within the vessel 3000 and moving or following fluid from the top portion 3030 of the vessel to the bottom portion 3010 of the vessel. The top portion 4020 of the force transfer device includes an opening 4050 to allow access to the inside of the force transfer device. The opening also allows any pressurized gas to enter the device so as to provide pressure on the fluid contained within the vessel below the force transfer device. The opening may be configured with a covering device (for example, a rubber sheet) or valving device (for example, check valves) to exclude foreign material from the inside of the force transfer device.

The bottom portion 4010 of the force transfer device 4000 may include fixed or removable ballast or a weight device 4100 secured to the bottom portion. Such a weight mechanism may further include one or more notches 4120 (for example, four notches) to allow drainage of fluid through the body of the force transfer device to a drainage plug 4200. A lifting ring 4300 may also be secured to the weight 4100 or wall 4060 of the force transfer device so that it may be lifted up from the bottom of the vessel to the top portion of the vessel during cleaning.

The force transfer device 4000 further includes a removable annular management device 4500 and one or more stabilizing fins 4600 located along the central perimeter of the middle portion 4020 of the transfer device. As shown in FIG. 24B, the replaceable annular management device may be configured in a plurality of sections 4510, 4520, 4530, 4540 that each section is positioned between each of the stabilizer fins 4600. As shown in FIG. 24C, the replaceable annular management device may be semi-circular in cross-section. The replaceable annular management device may have an outer diameter that is the same, less than or greater than the outer portion 4630 of each stabilizer fin. Suitable materials for the replaceable annular management device include natural and synthetic rubbers, VITON, silicone, fluorosilicone, neoprene, EPDM, HYPALON, butyl nitrile SBR, and other suitable materials. The replaceable device may be solid, hollow, semi-hollow or other various configurations. Such devices are available from AAA Acme Rubber Co., a division of Fillipone Enterprises, of Tempe, Ariz.

The replaceable annular management device 4600 may be secured to the body 4020 of the force transfer device 4000 by a plurality of screws, bolts or other mechanisms to allow the removable annular management device to be serviced (for example, replaced with one having a different diameter). As shown in FIG. 24A, the service, entry or access port (flange) 3200 is positioned such that when the force transfer device 4000 is at the bottom of the vessel 3010, the replaceable annular management device is accessible through the access port 3200 when the outer portion of the flange is removed. This configuration allows for changing the replaceable management device such that the gap 3050 (FIG. 23A) between the vessel wall and the force transfer device may be varied depending on the material used in the vessel. For example, a very small diameter annular management device may be used to create a large gap, such that a significant amount of fluid may pass (be retained) between the wall of the vessel and the force transfer device. Conversely, the annular management device may be configured such that it touches the inside wall of the vessel so as to scrap or otherwise remove retained fluid from the vessel wall.

The refillable material vessel 3000 of the present invention may further include a data logger that may be configured with various features as heretofore described regarding FIGS. 1 through 9. Additional aspects for the data logger may include a microbe detector (for example, a $CO_2$ detector), a particulate detector and/or an odor detector, wherein the detectors may include a monitoring device with audible and/or visual alarms. The vessel may be associated with a wireless device for transfer of information from the data logger via a cell phone, or other such radio frequency, microwave, infrared or laser device. The data logger and/or vessel may interface with a systems locator, such as a GPS device. The data logger and/or vessel may further include a radio frequency identification (RFID) system. The data logger may further interface with sensors, monitors and controls for temperature, pressure, humidity and pH detection and data storage. The data logger system may further include and interface with sensors, monitors and controls for material level and flow, which may be connected to internal limit switches. Various alarms may be further configured to interface with the data logger and such sensors, monitors and controls.

While particular forms of the present invention have been illustrated and described, it will also be apparent to those skilled in the art that various modifications can be made without departing from the spirit and scope of the invention. Accordingly, it is not intended that the invention be limited by the specific embodiments disclosed herein.

We claim:

1. A portable refillable material transfer system for storing, transporting, and dispensing a viscous fluid, comprising:

a portable vessel comprising a material storage section and a compressed gas section, with a force transfer device separating said sections;

an input/output manifold at a first end of the vessel for introducing the viscous fluid into the material storage section and dispensing the viscous fluid from the material storage section, the input/output manifold including a temperature sensor;

an energy transfer device for transferring thermal energy to the manifold;

a second sensor within said portable vessel for monitoring a condition of at least one of said vessel and said viscous fluid;

a GPS sensor for tracking a location of the portable vessel; and a transmitter for communicating to a remote receiver a location of the portable vessel based on the GPS sensor, and the condition based on the sensor.

2. The portable refillable material transfer system of claim 1, wherein the second sensor is a level sensor.

3. The portable refillable material transfer system of claim 1, wherein the second sensor is a pressure sensor.

4. The portable refillable material transfer system of claim 1, wherein the second sensor is a weight sensor.

5. The portable refillable material transfer system of claim 1, further comprising a data storage for storing readings of the second sensor.

6. The portable refillable material transfer system of claim 1, further comprising a programmable logic controller.

7. The portable refillable material transfer system of claim 1, further comprising an associated portable power supply.

8. The portable refillable material transfer system of claim 1, further comprising a pressure control system for managing a pressure in the compressed gas section.

9. The portable refillable material transfer system of claim 1, further comprising a cooling system for cooling the portable vessel.

10. The portable refillable material transfer system of claim 1, further comprising a robotic material dispenser system connected to the input/output manifold.

* * * * *